(12) United States Patent
Kimura

(10) Patent No.: US 8,667,839 B2
(45) Date of Patent: Mar. 11, 2014

(54) HEAT CONDUCTION-TYPE SENSOR FOR CALIBRATING EFFECTS OF TEMPERATURE AND TYPE OF FLUID, AND THERMAL FLOW SENSOR AND THERMAL BAROMETRIC SENSOR USING THIS SENSOR

(75) Inventor: Mitsuteru Kimura, Miyagi (JP)

(73) Assignee: Tohoku Gakuin, Miyagi (JP)

( * ) Notice: Subject to any disclaimer, the term of this patent is extended or adjusted under 35 U.S.C. 154(b) by 191 days.

(21) Appl. No.: 13/389,565

(22) PCT Filed: Jan. 13, 2012

(86) PCT No.: PCT/JP2012/050593
§ 371 (c)(1),
(2), (4) Date: Feb. 27, 2012

(87) PCT Pub. No.: WO2012/111368
PCT Pub. Date: Aug. 23, 2012

(65) Prior Publication Data
US 2012/0318058 A1    Dec. 20, 2012

(30) Foreign Application Priority Data

Feb. 18, 2011 (JP) .................................. 2011-032745

(51) Int. Cl.
*G01F 1/68* (2006.01)

(52) U.S. Cl.
USPC ........................................................ 73/204.26

(58) Field of Classification Search
USPC .............................. 73/204.26, 204.23, 204.27
See application file for complete search history.

(56) References Cited

U.S. PATENT DOCUMENTS

| | | | |
|---|---|---|---|
| 2007/0190329 A1* | 8/2007 | Wargo et al. | 428/411.1 |
| 2007/0209433 A1* | 9/2007 | Gehman et al. | 73/204.26 |

* cited by examiner

*Primary Examiner* — Jewel V Thompson
(74) *Attorney, Agent, or Firm* — Young & Thompson

(57) ABSTRACT

A heat conduction-type sensor corrects (calibrate) effects of a temperature of a measurement target fluid and a type of the fluid on a measurement value in measurement of a flow velocity, a mass flow, or an atmospheric pressure. Also provided is a thermal flow sensor and a thermal barometric sensor with this correcting function, high sensitivity, simple configuration, and low cost. At least two thin films that are thermally separated from a substrate through the same cavity are provided, one thin film comprises a heater and a temperature sensor, and the other thin film comprises at least one temperature sensor, the temperature sensors being thin-film thermocouples. The thin film is arranged in proximity so that it is heated only through the measurement target fluid by heating of the heater. A calibration circuit calculates and compares quantities concerning heat transfer coefficients of a standard fluid and the unknown measurement target fluid.

20 Claims, 14 Drawing Sheets

HEAT CONDUCTION-TYPE SENSOR FOR CALIBRATING EFFECTS OF TEMPERATURE AND TYPE OF FLUID, AND THERMAL FLOW SENSOR AND THERMAL BAROMETRIC SENSOR USING THIS SENSOR

TECHNICAL FIELD

The present invention relates to a heat conduction-type sensor that measures a flow such as a mass flow or a flow velocity of a fluid as a gas or a liquid or measures a pressure of a gas. The present invention provides a thermal flow sensor and a thermal barometric sensor as small and inexpensive heat conduction-type sensors with a simplified structure and high sensitivity each of which is provided with a function for enabling automatic calibration of effects of a temperature and a type of a fluid even though this fluid is unknown, the heat conduction-type sensor being applied to the thermal flow sensor and the thermal barometric sensor and being capable calibrating the effects of temperature dependence or a type such as a gas type of a measurement target fluid based on information concerning a heat transfer coefficient or temperature dependence of the measurement target fluid.

BACKGROUND ART

The present applicant has invented an "electric heater" (Patent Document 1) that forms a resistive element such as a platinum film on a film floating in midair and uses it as a heater, and this electric heater is applied as a micro heater for a flow sensor or a vacuum sensor at present. Further, the present applicant has also invented "heated diode temperature measuring apparatus, infrared temperature measuring apparatus and flow measuring apparatus using this apparatus, and method for manufacturing flow sensing unit" (Patent Document 2). Furthermore, since a semiconductor diode can be also used as a temperature sensor, the present applicant has suggested using the semiconductor diode as a heater and a temperature sensor. Then, the present applicant has also invented "thermocouple heater and temperature measuring apparatus using this heater" (a thermocouple heater) that can use a thermocouple as not only a temperature difference sensor but also a heater (Patent Document 3).

There has been conventionally a gas flow sensor as a heat conduction-type sensor which has a configuration bridging a groove-shaped flow path (a cavity) formed in a substrate, has three thin-film bridges (bridges made of thin films floating in midair) thermally separated from this substrate being symmetrically formed along the groove, has a platinum film formed on each thin-film bridge, uses the central thin-film bridge as a heater, and also uses the thin-film bridges on both sides as temperature sensors (Patent Document 4). Temperatures of the thin-film bridges on both the sides symmetrically provided with the central heater at the center have the same temperature when there is no flow of a gas along the flow path, but the thin-film bridge on the upstream side is cooled since a cold gas having a low ambient temperature flows thereto whilst the downstream side receives heat from the central heater thin-film bridge to increase the temperature when there is a flow of gas. As described above, since a temperature difference is produced between the thin-film bridges on both the sides of the heater due to a flow of the gas, this is a method for measuring a gas flow by utilizing this matter. However, a resistor temperature sensor such as a platinum thin-film is an absolute temperature sensor, and hence resistance itself is associated with an absolute temperature. Therefore, for example, since two absolute temperature sensors must be prepared in order to measure a temperature difference and a difference between outputs from these sensors must be obtained, this method is inappropriate to measure a fine temperature difference because of a large error.

Furthermore, in a conventional thermal flow sensor, a platinum thin film is used as a heater and an absolute temperature sensor in many cases. Therefore, since a variation with time is large and effects of an ambient temperature are reflected as they are since this sensor is an absolute temperature sensor, correcting the ambient temperature is difficult, many sensors and a temperature control system using these sensors are required to enable this correction, and the flow sensor necessarily becomes expensive.

In general, when a thin film floating in midair is used for thermal separation from a substrate, the heated thin film is subjected to heat radiation and cooled based on Newton's law of cooling in proportion to a temperature difference (T−Tc) between a temperature of the substrate which is an ambient environmental temperature Tc (an ambient temperature before being heated) and a temperature T of the heated thin film at the time of stopping heating, and the temperature of the thin film eventually becomes equal to the temperature of the substrate. In this manner, a temperature of a heated object is thermally conducted to a surrounding medium, and the temperature is increased or decreased in relation to a heat transfer coefficient of the surrounding medium. In the heat conduction-type sensor used for measuring a change in temperature of a temperature sensor to measure a physical state, e.g., a flow velocity, a mass flow, a degree of vacuum, an atmospheric pressure, and others of a surrounding medium, a temperature difference between a temperature of a substrate, which can be considered to as an ambient temperature Tc, and a temperature T of a heated thin film is more important than an absolute temperature. In this manner, to measure a temperature difference, a thermocouple or a thermopile as a small temperature-difference sensor that outputs a temperature difference only is more preferable than an absolute temperature sensor such as a platinum resistive element or a thermistor since it can perform measurement while being hardly affected by a change in ambient temperature.

The present inventor has invented an impurity concentration sensor as a gas flow sensor using a thermocouple which is a temperature difference sensor on ahead (Patent Document 5). Moreover, the present inventor has also invented a sensing unit and a thermal flow sensor having this unit mounted thereon as a temperature sensor that can measure a temperature difference by using a thermocouple on ahead (Patent Document 6). In this thermal flow sensor, a cavity is extended in a flow direction of a fluid of a heater, and the temperature sensor or the heater is formed on an SOI thin film that protrudes in a cantilever shape with a side surface of a substrate parallel to the flow direction of the cavity being used as a supporting portion. Additionally, although the cantilever-shaped thin film of the heater is arranged at the center, and thermocouples are formed into a similar cantilever-shaped thin film and arranged on an upstream side and a downstream side of the flow on both sides in close proximity, the cantilever-shaped thin film of the heater and the thin film having the temperature sensor formed thereon are not coupled with each other excluding the supporting portion, and hence heat from the cantilever-shaped heater (the thermocouples can be also used as heater in this example) is thermally conducted only through a surrounding fluid such as a gas which is a measurement target fluid to heat the thin films having the temperature sensors arranged on the upstream side and the downstream side on both sides of the heater. Therefore, the cantilever-shaped thin film having the temperature sensor on the upstream side is cooled by a flow of the fluid, and the cantilever-shaped thin film having the temperature sensor on the downstream side receive heat from the heater to increase a temperature, thereby measuring a flow of the fluid with high sensitivity based on a temperature of the fluid alone. However, there is a problem that a heat transfer coefficient of the fluid varies when a temperature of the surrounding fluid changes and, although the thermocouples as temperature difference sensors are provided as the temperature sensor, a temperature difference output differs due to a fluctuation of temperature of the fluid itself even when the heater is heated with the same power or the same is heated while controlling to provide a temperature difference from the same substrate because of temperature dependence of the heat transfer coefficient of the fluid, thereby complicating temperature correction. Of course, when a type of the fluid is changed, its heat transfer coefficient differs, and hence there is a problem that effects of the type of the fluid are also considerable.

There has conventionally been a flow sensor which has a thermopile provided on the same thin film formed in the same cavity and has heaters symmetrically formed and arranged on the upstream side and the downstream side to measure only a difference between preceding and subsequent temperatures of a heater generated due to a flow of a fluid, whereby temperature dependence of a heat transfer coefficient of the fluid is finally reduced (Patent Document 7). However, these examples have a problem that a region of the sensor portions is necessarily increased since the thermopile is used to amplify a temperature difference output, a diaphragm structure must be provided to increase a junction area with respect to the substrate in order to form many cold junctions, whereby heat from the heater flows to the substrate side to reduce the temperature and a temperature sensor region has a temperature distribution. Further, a flow sensor that has a heater at the center, and thermocouples arranged in a radial pattern or a temperature-sensitive resistive element thin film being arranged around the heater has been also conventionally reported (Patent Document 8), but a thin film is extended along a flow direction of a fluid and a supporting portion is also provided in the flow direction, whereby movement of heat is promoted in the flow direction of the fluid to form a temperature distribution. In particular, when using thermocouples as a temperature sensor, there is a problem that heat that moves along the flow of the fluid is conducted to the substrate side in the flow direction to facilitate cooling and a position of a peak in the temperature distribution may possibly get across a position of a hot junction of the thermocouples.

In general, when measuring a physical quantity (which represents physical properties such as density, thermal conductivity, or specific heat inherent to a measurement target fluid here) or a physical state (which represents an adjustable amount such as a flow velocity, a mass flow or an atmospheric pressure of the measurement target fluid here) of the measurement target fluid, a sensor that transfers heat from a heater having heat to a temperature sensor based on heat conduction through the measurement target fluid to grasp the physical quantity or the physical state of the measurement target fluid based on an output from the temperature sensor is called a heat conduction-type sensor.

Therefore, a thermal flow sensor or a thermal barometric sensor according to the present invention also falls within the category of the heat conduction-type sensor and has common points as the heat conduction-type sensor. In conventional technologies, when using the thermal flow sensor to measure a flow velocity or a mass flow of a measurement target fluid, a type of the measurement target fluid must be known in advance. In such a situation, in case of a specific standard measurement target fluid (a standard gas), e.g., a gas, when an output value such as a flow velocity or a mass flow of the thermal flow sensor which is indicated by utilizing basic data of a nitrogen gas such as a degree of thermal conductivity at 20° C. and 1 atmosphere is changed since a type of the measurement target fluid is different from the standard gas, the output value, e.g., a flow velocity or a mass flow of the thermal flow sensor is calibrated using known basic data such as a degree of thermal conductivity of the measurement target fluid at a temperature or an atmospheric pressure of the measurement target fluid. In measurement of a mass flow (e.g., a mass flow rate) of a helium gas or a hydrogen gas having a high degree of thermal conductivity, the indication largely deviates from that of the nitrogen gas as the standard gas, and calibration must be necessarily performed. This situation is the same in regard to the thermal barometric sensor as the heat conduction-type sensor, a gas type of a measurement target fluid must be known in advance and an output value must be calibrated as long as a heat transfer coefficient of the measurement target fluid concerns the measurement. As described above, the heat conduction-type sensor that can perform automatic calibration without knowing a gas type of a measurement target fluid in advance has been demanded.

CITATION LIST

Patent Documents

Patent Document 1: Japanese Unexamined Patent Application Publication No. Sho 55-119381 (Japanese Patent No. 139824)
Patent Document 2: Japanese Unexamined Patent Application Publication No. 2006-250736
Patent Document 3: Japanese Unexamined Patent Application Publication No. 2009-79965
Patent Document 4: U.S. Patent Publication No. 004478077
Patent Document 5: Japanese Unexamined Patent Application Publication No. 2009-128254
Patent Document 6: Japanese Unexamined Patent Application Publication No. 2010-230601
Patent Document 7: Japanese Unexamined Patent Application Publication No. 2001-165731
Patent Document 8: Japanese Translation of PCT International Application Publication No. 2004-514153

DISCLOSURE OF INVENTION

Problem to be Solved by the Invention

To solve the above-described problems, it is an object of the present invention to provide a heat conduction-type sensor configured to enable automatic correction (calibration) of effects of a fluid temperature, an ambient temperature (a room temperature), and a type of a fluid to reduce the effects as much as possible when measuring a physical state (which is mainly a flow velocity, a mass flow, or an atmospheric pressure) of a measurement target fluid such as a gas or a liquid, to provide a small and inexpensive thermal flow sensor and thermal barometric sensor each having high sensitivity and a simple configuration by using this sensor, and to enable specifying a type of the measurement target fluid.

Means for Solving Problem

To this end, a heat conduction-type sensor according to claim 1 of the present invention comprises at least two thin films thermally separated from a substrate (1) by the same cavity (40), and characterized in that one thin film (10) comprises at least a heater (25) and a temperature sensor (20), the other thin film (12) comprises a temperature sensor (20), the thin film (10) and the thin film (12) are formed to be arranged in proximity to and spatially separated from each other so that the thin film (12) is heated only through a measurement target fluid when the thin film (10) is heated by the heater (25), and the substrate (1) comprises calibration circuit means (200) configured to calculate an amount concerning heat transfer coefficients of a standard fluid and the unknown measurement target fluid based on information concerning a temperature of the heater (25) when heating the heater (25), information concerning temperatures of the standard fluid and the unknown measurement target fluid from the temperature sensor (20) formed on the thin film (12), and information of a temperature of the measurement target fluid at the time of measuring a physical state of the measurement target fluid and to calibrate effects of a temperature and a type of the measurement target fluid on the measurement of the physical state of the measurement target fluid based on the amount concerning the heat transfer coefficients, or the substrate (1) comprises a calibration circuit terminal configured to communicate with the calibration circuit means (200) provided outside.

According to the heat conduction-type sensor, since a heat transfer coefficient changes based on a temperature of the surrounding fluid and a type of this fluid and a large error is generated in a mass flow or an atmospheric pressure which is a physical state of the measurement target fluid calibrated based on a specific fluid unless thermal properties of a material in the surrounding fluid are known in advance, temperatures of the thin films (thermally separated from the substrate 1 by the same cavity 40) that are heated by the heater and flowing in midair are calibrated based on thermal properties, which are essentially heat transfer coefficients at a temperature and a pressure of the material in the surrounding fluid prepared in advance, thereby correcting the temperatures to correct measurement values. Since the heat conduction-type sensor according to the present invention is arranged and configured in such a manner that heat from the heater 25 is transferred only through the measurement target fluid to the thin film 12 arranged in proximity to the heater 25, and information of the heat transfer coefficient of the measurement target fluid at an ambient temperature can be obtained from an increase in temperature of the thin film 12. When this information is used, information concerning the heat transfer coefficient of the unknown measurement target fluid can be obtained through the calibration circuit means 200 from a known relationship between a temperature of the heater 25 portion of the thin film 10 in a reference fluid (e.g., a specific known fluid such as a nitrogen gas when the fluid is a gas) and a temperature of the thin film 12 in this reference fluid and a relationship between these temperatures in the unknown measurement target fluid by, e.g., fixing heater supply power at the same ambient temperature or by controlling to maintain a predetermined temperature rise with respect to the ambient temperature, and calibration is carried out based on this information so that indication of a mass flow or an atmospheric pressure which is a measured physical state of the measurement target fluid is not affected by the temperature and the type of the measurement target fluid. Combining the thin film 12 and the calibration circuit means 200 enables achieving true indication of the mass flow or the atmospheric pressure as the physical state of the measurement target fluid. It is to be noted that the arrangement and configuration by which heat from the heater 25 is transferred only through the measurement target fluid to the thin film 12 provided in proximity means that direct heat conduction excluding heat conduction using the supporting portion on the substrate 1 is carried out only through the measurement target fluid here even though there is heat transfer to the thin film 12 through the substrate 1 supporting the heater 25 or the thin film 12 and this heat transfer cannot be ignored. It is to be noted that, in regard to selection of the reference fluid, a known liquid whose data has been already prepared can be used when the measurement target fluid is a liquid, and a known gas (which will be referred to as a standard gas) whose data has been already prepared can be used when the measurement target fluid is a gas.

A heat conducting amount per unit area, simply at a temperature, or per unit time is called a heat transfer coefficient h, and a heat transfer amount Q [W] from an object having a surface temperature Tw to a temperature Ta is represented by Expression 1 based on Newton's law of cooling.

$$Q = hA(Tw - Ta) \qquad \text{Expression 1}$$

In this expression, A is a heat transfer area $[m^2]$. Further, a heat transfer coefficient h $[W/(m^2K)]$ at the time of forced convection is represented by the following Expression 2.

$$h = Nk/L \qquad \text{[Expression 2]}$$

In this expression, N is a Nusselt number, and k is a degree of heat conductivity $[W/(m \cdot K)]$ of the fluid and a function of a temperature. L[m] is a length of the object in a flow direction. Furthermore, the Nusselt number N is represented by a function of a Reynolds number Re (a function that is proportionate to a fluid velocity V raised to ½ power) and a Prandtl number Pr. Therefore, the heat transfer coefficient h is a function of a velocity or a temperature of the fluid. Additionally, there is King's law that a heat quantity $Q_f$[W] taken from the heated object in the flowing fluid is proportionate to ½ of the velocity V of the fluid, and it is represented as follows.

$$Q_f = \{a + b(\rho V)^{1/2}\}(Tw - Ta) \qquad \text{[Expression 3]}$$

In this expression, a and b are constants determined by the fluid or the heated object, r is density of the fluid, and (Tw−Ta) is difference between a surface temperature (Tw) of the heated objected and a temperature (Ta) of the surrounding fluid like Expression 1. As described above, as compared with Expression 1, it can be understood that a in Expression 3 corresponds to a product of the heat transfer coefficient h of the measurement target fluid and the heat transfer area A which is a constant. Further, a difference between $Q_f$ in Expression 3 and Q in Expression 1 is a term based on the velocity V of the fluid, and the presentation returns to Expression 1 when the velocity V is zero. However, Expression 1 also represents a situation that the measurement target fluid has a flow, and it can be understood that effect of the flow velocity is represented in the form of Expression 2 using, e.g., the degree of thermal conductivity k which is a function of a temperature or the Reynolds number Re which is a function of a flow velocity. Furthermore, in Expression 3, $Q_f$ relates to density of the fluid raised to ½ power, and (rV) corresponds to a mass flow (an actual mass flow is a product of (rV) and a cross-sectional area S of a flow). Therefore, it can be said from Expression 3 that a heat quantity taken by a flow in $Q_f$ is proportionate to the mass flow (rV) raised to ½ power when (Tw−Ta) is maintained constant. In this manner, the principle of the thermal flow sensor can be easily understood in terms of physical aspects since the measurement target fluid has a flow and hence using Expression 3 enables separating the term of the velocity V. However, in Expression 1 that can be also experimentally used, since the term of the fluid velocity V or the temperature is present in one heat transfer coefficient h, this term can be easily treated as the heat transfer coefficient h. When Expression 3 having the separated term of the velocity V is used in this manner, since $Q_f$ in Expression 3 with the measurement target fluid having a flow is raised and a quantity of taken heat is increased, it becomes clear that the object heated by the heater results in a reduction in temperature. Here, a point to notice is that "a heat quantity taken from the heated object is proportionate to ½ of the velocity V of the fluid" in King's law is achieved under the condition of a situation that (Tw−Ta) is fixed.

Like the above expressions, a heat transfer quantity from the heated object to the surrounding fluid is proportionate to a temperature difference between the object and the fluid, and a heat transfer quantity per unit area is a heat transfer quantity h of the fluid. Furthermore, the heat transfer quantity h is proportionate to the degree of thermal conductivity k inherent to the object in the fluid. In general, the degree of thermal conductivity k of the fluid is a function of temperature, and it is raised with an increase in temperature. If the measurement target fluid does not have a flow, the degree of thermal conductivity h is determined as a function of a type, a temperature, and a pressure (e.g., an atmospheric pressure) of the measurement target fluid. Moreover, an increase in temperature of the small thin film which is closely arranged so that heat from the heater is conducted thereto only through the measurement target fluid and is provided with the temperature sensor is determined based on the degree of thermal conductivity at a temperature of the heater and a temperature and a pressure of the measurement target fluid if a distance between the heater and the temperature sensor is fixed. Therefore, when the distance between the heater and the temperature sensor is fixed, the temperature and the pressure of the measurement target fluid are known in advance, and the temperature of the heater is known in advance by measurement performed using any method, measuring an increase in temperature of the temperature sensor enables determining the heat transfer coefficient of the measurement target fluid at that moment. Additionally, if the heat transfer coefficient at this temperature and the atmospheric pressure in a state with no flow is revealed, the degree of thermal conductivity can take a value inherent to the object. Since the heat transfer coefficient includes this degree of thermal conductivity, an approximate type of the measurement target fluid such as a gas becomes clear. Further, since the degree of thermal conductivity has temperature dependence, the heat transfer coefficient also has temperature dependence, detailed temperature dependence data (information) can be obtained by changing not only a temperature at one point but also a temperature of the measurement target fluid and measuring a heat transfer coefficient at each temperature, thereby specifying a type of the measurement target fluid.

In case of using the present invention as the thermal flow sensor, when stopping a flow of the measurement target fluid and measuring an increase in temperature of the temperature sensor 20 of the adjacent thin film 12 under the heater 25 of the thin film 10 heated to, e.g., a specific temperature, measurement is first carried out with respect to a standard gas (e.g., a nitrogen gas) whose heat transfer coefficient is already known, then measurement is performed with respect to the measurement target fluid based on an increase in temperature of the temperature sensor 20 of the thin film 12 at that moment, and a quantity concerning a heat transfer coefficient of the measurement target fluid based on the standard gas, e.g., a ratio of the heat transfer coefficients of the standard gas and the measurement target fluid is obtained (e.g., a database concerning the standard gas is provided in a memory in advance, and processing is carried out using an arithmetic circuit of the calibration circuit means 200 to obtain a value). This quantity concerning the heat transfer coefficient can be utilized to calibrate and indicate a flow velocity or a mass flow as a physical state of the measurement target fluid when the measurement target fluid flows. In this manner, the heat transfer coefficient of the measurement target fluid does not have to actually obtained, and it is sufficient to just obtain a ratio of outputs from the temperature sensor of the thin film 12 under the same measurement conditions (an increase in heater temperature from an ambient temperature, an atmospheric temperature, a fluid temperature, a no-flow state) in case of the standard gas and in case of the measurement target fluid. That is because this ratio of outputs is associated with a ratio of heat transfer coefficients of the standard gas and the measurement target fluid under the same conditions.

Further, in case of using the present invention as the thermal barometric sensor, the effects of a temperature of a gas or a type of the gas can be automatically calibrated with respect to an atmospheric pressure as a physical state of a measurement target fluid by utilizing data (information) acquired in advance in a state that a gas has no flow at a temperature of this unknown gas under the same conditions as those for a known specific gas (e.g., a nitrogen gas), thereby indicating a true atmospheric pressure.

In measurement for an increase in temperature of the temperature sensor, using a thermocouple for the temperature sensor is advantageous since the thermocouple is a temperature difference sensor. Further, even if the measurement target fluid has a flow, a mass flow or a flow velocity as a physical state of the measurement target fluid and a barometric pressure of the gas can be automatically calibrated by changing intensity of the flow in many ways and by utilizing a fact that a heat quantity taken from by the heater 25 of the thin film 10 heated with predetermined power is proportionate to the flow velocity raised to ½ power and that an increase in temperature in a steady state of the measurement target fluid having a fixed heat transfer coefficient is proportionate to the power distributing to heating of the heater 25. Further, when a temperature of the thin film 10 having the heater 25 is measured and the temperature of the thin film 10 is controlled by a control circuit to maintain it at a predetermined constant temperature, a heat quantity taken from the thin film 10 can be easily measured from a change in power consumption.

For example, in case of embodying the heat conduction-type sensor as a thermal flow sensor, when the thin film 12 is present on the upstream side of the thin film 10, output information (data when the measurement target fluid has no flow and data when this fluid has a flow even though there is a flow) from the temperature sensor 20 (e.g., a thin-film thermocouple 120) formed on the thin film 12 can be utilized to obtain, e.g., information concerning at least a heat transfer coefficient in physical properties of the measurement target fluid which is an ambient gas. The heat transfer coefficient of the measurement target fluid greatly changes depending on a type, a temperature, or an atmospheric pressure of this fluid. Therefore, thorough correction (calibration) of an ambient temperature and others concerning a flow of the measurement target fluid can be carried out by utilizing this obtained heat transfer coefficient. In case of embodying the heat conduction-type sensor as the thermal barometric sensor, effects of a minute change in ambient temperature concerning an atmospheric pressure of the measurement target fluid can be likewise corrected (calibrated) in a state where an air flow is not present.

The heat conduction-type sensor according to claim 2 of the present invention comprises temperature changing means (250) for changing a heating temperature of the heater (25), wherein the temperature changing means (25) is configured to enable obtaining the information when a temperature is changed, thereby specifying a type of the measurement target fluid.

Regarding the same heater supply power at the same ambient temperature, information of a heat transfer coefficient of the measurement target fluid at this ambient temperature can be obtained. However, since the heat transfer coefficient of the measurement target fluid has temperature dependence, when an ambient environmental temperature varies, the heat transfer efficiency also varies. Although the ambient environmental temperature can be adjusted by an external heater, a heating temperature is changed by the temperature changing means of the heater 25 to vary a temperature of the measurement target fluid near the heater 25 without using the external heater in the present invention. There is provided the heat conduction-type sensor that measures a temperature of the thin film 10 heated by the heater 25 and a temperature of the closely arranged thin film 12 by using the temperature sensors 20 formed on these films to obtain temperature dependence of the heat transfer coefficient of the measurement target fluid, or uses the temperature dependence to specify the measurement target fluid, or enables more accurately calibrating effects of a temperature and a type of the measurement target fluid in physical state measurement of the measurement target fluid. It is to be noted that the temperature changing means 250 can be provided outside a sensor chip of the heat conduction-type sensor since temperature control is required.

In the heat conduction-type sensor according to claim 3 of the present invention, the temperature sensor (20) is a thin-film thermocouple (120).

When the heater 25 formed on the thin film 10 serves as a resistance temperature detector of platinum (Pt) and others, the heater 25 can be also used as the temperature sensor 20. However, the temperature sensor 20 is daringly the thin-film thermocouple 120 here. Since the thin-film thermocouple 120 is a temperature difference sensor and outputs a temperature difference only, when an ambient temperature is determined as a reference temperature, a temperature change alone is output based on the fluctuating ambient temperature even though the ambient temperature fluctuates. There is an advantage that the ambient temperature is assumed to be zero and the temperature change can be accurately measured based on this ambient temperature by a null-balance method, and the temperature difference can be exactly measured based on differentials of the thin-film thermocouples 120 without effects of a change in ambient temperature when the thin-film thermocouple 120 is formed on the thin film 10 having the heater 25 formed thereon and the thin-film thermocouple 120 is also formed on the closely arranged thin film 12, for example. Although the thin-film thermocouples 120 are used, a thermopile having the thermocouples connected in series may be used. However, as compared with one thin-film thermocouple, the thermopile has higher sensitivity, but it is not suitable for providing a micro-sensor since the thermopile has a large area, and a temperature as an average value in this area is measured.

A temperature of the measurement target fluid is generally different from an ambient temperature (a room temperature) outside the heat conduction-type sensor. However, it is desirable for the heat conduction-type sensor to conform the temperature of the measurement target fluid to the ambient temperature. Therefore, it is desirable to expose a temperature of a substrate 1 (a substrate temperature) of a semiconductor sensor chip in the heat conduction-type sensor to a temperature of the measurement target fluid for a long time, set the substrate temperature to be equal to the temperature of the measurement target fluid, and then perform the measurement.

In the heat conduction-type sensor according to claim 4 of the present invention, an absolute temperature sensor is formed on the substrate (1).

Since the thin-film thermocouple 120 as the temperature sensor is the temperature difference sensor, it measures a temperature difference from a hot junction (or a cold junction) alone based on the cold junction (or the hot junction). Therefore, in temperature correction and others, an absolute temperature of a reference temperature is required. Accordingly, the substrate 1 having a high heat capacity and a high degree of thermal conductivity is often used for determining the reference temperature. In such a case, an absolute temperature sensor is fabricated on the substrate 1, the substrate is used for the reference temperature, and occasionally measuring this reference temperature is enabled. Since the cold junction of the thin-film thermocouple 120 is formed on the substrate 1, fabricating the absolute temperature sensor on the substrate 1 is important. An output from this absolute temperature sensor can be used to correct an ambient temperature.

As the absolute temperature sensor, it is possible to use a temperature-sensitive resistor such as a pn junction diode, a schottky junction diode, or a platinum thin film, a thermistor, and others.

In the heat conduction-type sensor according to claim 5 of the present invention, the thin film (10) and the thin film (20) are constituted of an SOI layer.

The thin film thermally separated from the substrate 1 by the cavity 40 can be readily formed of a thin film of an SOI layer (a Silicon on Insulator layer) by the manufacturing technology. In general, since the SOI layer is a single-crystal silicon layer, it has an advantage that an n type or a p type can be selected as its conductivity type, a thin film of a semiconductor layer having a floating configuration having the cavity 40 in the lower portion, circuit components such as a diode or a transistor, and an IC combined with these components can be formed by a known semiconductor integration technology or a micromachining technology.

A thermal flow sensor according to claim 6 of the present invention is characterized in that the physical state of the measurement target fluid in the heat conduction-type sensor according to any one of claims 1 to 5 is a flow velocity or a mass flow, and the calibration circuit means (200) comprises at least an amplification circuit, an arithmetic circuit, and a control circuit.

The thermal flow sensor according to claim 7 of the present invention comprises a thin film (11) thermally separated from a substrate (1) through the cavity (40) besides the thin film (10), and characterized in that the thin film (11) comprises a temperature sensor (20), the thin film (11) and the thin film (10) are coupled through a coupling thin film (13) whose width is narrowed to have thermal resistance in the vicinity of a maximum temperature region (85), and the thin film (11) is heated through the coupling thin film (13) when the thin film (10) is heated by the heater (25).

When the thin film 10 and the thin film 11 do not have a coupling portion where heat transfer occurs except heat transfer using the substrate 1 via supporting portions of these films and these films are independent from each other, a temperature of the thin film 11 having the temperature sensor 20 is increased only through a fluid such as a gas even though the heater 25 formed on the thin film 10 is heated. Therefore, since a type of the measurement target fluid or a change in heat transfer coefficient due to a temperature is directly reflected in the increase in temperature of the thin film 11, the increase in temperature of the thin film 11 is changed due to a change in the type or the temperature of the fluid. In the present invention, at the time of heating the thin film 10 with the heater 25 formed thereon, when the maximum temperature region 85 (which means a region having the highest temperature, and is a region at a substantially distal end portion in a cantilever configuration or a region near a substantially central portion in a bridge structure) of the thin film 10 is coupled with a region having a hot junction 81 of the thin-film thermocouple 120 formed on the thin film 11 by using the coupling thin film 13, heat conduction occurs through the coupling thin film 13, and a temperature of the thin film 11 increases. In general, although this coupling thin film 13 which is a solid substance has thermal resistance, since a solid substance has higher heat transfer coefficient than that of a fluid such as a gas, it is important to increase thermal conduction through this coupling thin film 13 (e.g., increasing the thermal conduction to be 1 digit higher than) beyond thermal conduction through the fluid by selecting a length, a width, a thickness, and a material. Of course, since a temperature difference must be produced between both ends of the coupling thin film 13 that performs coupling by a flow of the fluid, a length, a width, a thickness, and a material that determine the thermal resistance must be selected, and design that produces an appropriate temperature difference is required. Accordingly, it is possible to obtain effect that thermal conduction of a solid substance through the coupling thin film 13 for the thin film 10 and the thin film 11 can reduce effects of a change in heat transfer coefficient due to a type or a temperature of the measurement target fluid as much as possible.

The present invention is characterized in effect that thermal conduction of a solid substance through the coupling thin film 13 for the thin film 10 and the thin film 11 can greatly reduce effects of a change in heat transfer coefficient due to a type or a temperature of the measurement target fluid, and it provides as the heat conduction-type sensor the thermal flow sensor that comprises a thin film 12 which is different from the thin film 10 and the thin film 11, thermally separated from the independent substrate, and has the temperature sensor 20, and which enables more accurate automatic calibration with respect to effects of a temperature and a type of the measurement target fluid by using calibration circuit means 200 configured to further correct (calibrate) the effects of the temperature and the type of the measurement target fluid based on information a heat transfer coefficient of the measurement target fluid from the temperature sensor 20 on this thin film 12, temperature information of the thin film 10 and the thin film 11, and absolute temperature information of the measurement target fluid.

The cavity 40 formed in the substrate 1 is formed along a flow of the measurement target fluid such as a gas, and the cavity 40 is generally surrounded by the substrate 1, but one side of the cavity 40 may be formed into an open end without the substrate in some cases. Exposure end surfaces of the substrate are generally provided on both sides of the cavity 40 parallel to the flow direction of the fluid, and it is good to form the supporting portion of the thin film 10 or the thin film 11 on the exposure end surfaces of the substrate on both sides parallel to the flow direction and prevent the supporting portion from being formed along the flow direction of the measurement target fluid in terms of heat loss because of inflow of heat to the substrate in thermal conduction along the flow direction of the measurement target fluid. In case of a hinged structure, which is a cantilever structure (a cantilever beam structure), as the thin film 10 or the thin film 11, a structure extending from one end surface of the substrate 1 toward the cavity 40 is desirable. In case of a structure bridging the cavity 40, it is desirable for the thin film 10 or the thin film 11 to have a structure which has supporting portions on both end surfaces of the substrate provided on both sides of the cavity 40, serves as a bridge structure for the cavity 40, and has no supporting portion along the flow direction of the measurement target fluid. As described above, when the structure having no supporting portion in the flow direction of the measurement target fluid is provided for the thin film 10 or the thin film 11, a temperature at the hot junction 81 of the thin film 11 on the downstream side is apt to be increased by a flow of the measurement target fluid heated by the heater 25, and heat can be prevented from being flowed into the substrate 1 along the flow direction through the thin film 10 or the thin film 11. However, the supporting portions may have a large width for reinforcement near the end surfaces of the substrate 1 on one side or both sides thereof along the flow of the cavity 40, or holes may be formed in each widened region to suppress thermal conduction with respect to the substrate 1.

The thermal flow sensor according to the present invention possibly means a sensor chip of the thermal flow sensor or possibly means modularization including a circuit such as a drive circuit in the sensor chip or an apparatus that measures a flow of a fluid in some cases.

Since the sensor chip of the thermal flow sensor according to the present invention has a very small dimension, e.g., a size of approximately 2 square mm that can be manufactured by an MEMS technology, it has a small heat capacity and, even if an ambient temperature such as a room temperature fluctuates, the sensor chip also rapidly reaches this temperature. Therefore, it can be considered that a temperature of the substrate 1 of the sensor chip is also close to the ambient temperature. Further, although there is a possibility that a temperature of the measurement target fluid is different from the ambient temperature, it is good to approximate a temperature difference between the ambient temperature and the temperature of the measurement target fluid, i.e., a temperature difference between the sensor chip and the measurement target fluid to zero by reducing a heat capacity of a system having the sensor chip disposed thereto or rapidly approximately the temperature of the measurement target fluid to the ambient temperature. Of course, since a region of the thin film 10 or the thin film 11, which protrudes toward the cavity 40, formed on the substrate 1 of the sensor chip has a very low heat capacity, this region has a temperature of the measurement target fluid if it is not heated by the heater 25, and hence it has the ambient temperature. When the thin film 10 is heated by the heater 25, thermal conductance of heat radiation becomes constant if the measurement target fluid has a fixed heat transfer coefficient but does not have a flow, and hence a temperature rise $\Delta T$ from the substrate 1 (a temperature difference from the substrate) becomes constant under the same electric power for heating. Further, when heating is stopped, the temperature rise $\Delta T$ becomes zero, and the thin film 10 returns to the original ambient temperature. In this manner, since the temperature rise $\Delta T$, which is the temperature difference from the substrate becomes constant under the constant electric power for heating as supply power, a thermocouple or a thermopile as a temperature difference sensor is optimum as the temperature sensor.

In the thermal flow sensor according to claim 8 of the present invention, the thin film (11) and the coupling thin film (13) are constituted of an SOI layer.

In the thermal flow sensor according to claim 9 of the present invention, a pn junction diode is formed on the coupling thin film (13) to obtain electrical insulation of the thin film (10) and the thin film (11).

Although a current is flowed through the heater 25 formed on the thin film 10 to heat the thin film 10, if both the coupling thin film 13 and the thin film 11 are formed of the continuous SOI layer in case of energizing and heating the thin film 10 of the SOI layer by this heater 25, the current is also flowed through the thin-film thermocouple 120 through the hot junction region of the thin-film thermocouple 120 as the temperature sensor formed on the thin film 11, and electromotive force may be possibly generated in the thin-film thermocouple 120. This becomes a problem when the drive circuit of the heater 25 and a thermal electromotive force amplification circuit of the thin film thermocouple 120 are grounded in common in particular. Therefore, a pn junction diode is formed on the coupling thin film 13 constituted of the SOI layer, and its potential barrier is used to electrically separate the thin film 10 from the thin film 11. In particular, it is good to set the pn junction diode and a direction of the current in the heater 25 in such a manner that the pn junction diode can have a reverse bias when a current is flowed through the heater 25.

Of course, in case of heating using a metal thin-film resistance heater formed on an insulator thin film formed on the thin film 10 of the SOI layer rather than using the heater 25 to energize and heat the SOI layer of the thin film 10 constituted of the SOI layer which is one thermocouple conductor of the thin-film thermocouple 120, this insulator thin film electrically insulates the heater 25 from the hot junction region of the thin-film thermocouple 120, and hence the pn junction does not have to be formed.

In the thermal flow sensor according to claim 10 of the present invention, a temperature-sensitive resistor, a thermocouple, or a diode is used as the heater (25) provided on the thin film (10), and the heater (25) is configured to be also used as a heater and a temperature sensor as required.

The SOI layer portion of the thin film 10 constituted of the SOI layer may be energized by a resistor, which is the heater 25, and the heater may be determined as a temperature-sensitive resistor and treated as a temperature sensor. Further, the SOI layer portion as the temperature sensor may be used as a thermocouple conductor material of one thermocouple, or a thermocouple or a temperature-sensitive resistor formed on an insulator film formed thereon may be used. Furthermore, since the SOI layer portion is a single-crystal silicon thin film, it can be operated as a heater which is a main constituent of a junction by forming a pn junction diode and flowing a current through this pn junction diode in a forward direction, or this pn junction diode can be used as the temperature sensor.

The thermal flow sensor according to claim 11 of the present invention comprises at least two thin films, i.e., a thin film (11a) having a thin-film thermocouple (120a) provided on the upstream side and a thin film (11b) having a thin-film thermocouple (120b) provided on the downstream side as the thin film 11 having the thin-film thermocouple (120) provided thereon with respect to the thin film (10), and regions of hot junctions of the respective thin-film thermocouples (120a, 120b) are coupled with the thin film (10) through respective solid coupling thin film (13a) and thin film (13b) in the vicinity of a maximum temperature region (85).

To measure a flow of the measurement target fluid such as a gas or a liquid, there has been conventionally known means by which a thin-film heater flowing in midair is installed in the middle of a flow path, temperature sensors are formed on thin films that have temperature sensors and are floating in midair on the upstream side and the downstream side, a flow is measured from a difference between outputs from these temperature sensors. Like the present invention, thin-film thermocouples are formed as the temperature sensors, and positions near hot junctions of these thin-film thermocouples 120a and 120b are coupled with a maximum temperature region of the thin film 10 by a coupling thin film 13a and a coupling thin film 13b each having thermal resistance and made of a solid substance. A difference between outputs from these thin-film thermocouples 120a and 120b can be used to measure a small flow of the measurement target fluid. Since the thin film 11b on the downstream side is heated through the coupling thin film 13b, the hot junction region of the thin-film thermocouple 120b formed on the thin film 11b is heated to a temperature close to a maximum temperature region 85 of the thin film 10. In particular, since the thin-film thermocouples 120a and 120b as the temperature difference sensor are used, when heating is effected by the heater 25, a temperature rise is measured, the temperature rise with respect to an ambient temperature is proportionate to power consumption, and an influence of a change in ambient temperature corresponding to the temperature rise is very small. Therefore, in this case, ambient temperature dependence such as a temperature difference output can be represented as a linear change, a combination of the thin film 12 and the substrate 1 or the calibration circuit means 200 provided outside can lessen correction of the ambient temperature, and hence the calibration circuit means 200 having a simple circuit can suffice.

A thermal atmospheric pressure sensor according to claim 12 of the present invention is characterized in that the physical state of the measurement target fluid in the heat conduction-type sensor according to any one of claims 1 to 5 is an atmospheric pressure, and the calibration circuit means (200) comprises at least an amplification circuit, an arithmetic circuit, and a control circuit.

Like the above example where the physical state of the measurement target fluid is determined as a flow velocity or a mass flow and the thermal atmospheric pressure sensor is applied to the thermal flow sensor, in this example, the thermal atmospheric pressure sensor is applied to the thermal atmospheric pressure sensor to enable automatically calibrating effects of a physical value, which is especially a heat transfer coefficient, of a measurement target gas based on a temperature or a type of the gas as the measurement target fluid, whereby at least information of an atmospheric pressure can be output so that the atmospheric pressure from a vacuum to 1 atmosphere or above can be indicated.

To apply the heat conduction-type sensor to the thermal flow sensor or the thermal atmospheric pressure sensor to be provided, it is necessary to mount an amplification circuit, an arithmetic circuit, a heater drive circuit, and the calibration circuit means 200 that eliminates effects of a type or a temperature of the measurement target fluid by measuring a heat transfer coefficient and the like of the measurement target fluid at a given temperature besides a sensor sensing portion. This calibration circuit means 200 may be mounted on a substrate of a semiconductor or the like (a semiconductor sensor chip), or a part or all of this calibration circuit means 200 may be provided outside the semiconductor sensor chip. The present invention includes a case where this calibration circuit means 200 is mounted on such a semiconductor sensor chip or a case of providing the thermal flow sensor or the thermal atmospheric pressure sensor as the heat conduction-type sensor modularized by providing a calibration circuit terminal is provided to the semiconductor sensor chip and providing this calibration circuit means 200 outside the semiconductor sensor chip.

In the thermal barometric pressure sensor according to claim 13 of the present invention, the thin film (10) has a configuration of a cantilever (46), the cantilever (46) is divided into a region A (48) on a supporting portion side thereof and a region B (49) on an end side thereof through a thermal resistance region (47), the region A (48) comprises at least a heater (25) and a temperature (20), and the region B (49) comprises a temperature sensor (20).

The thermal barometric pressure sensor according to the present invention is configured to enable highly accurately measuring an atmospheric pressure which is especially an atmospheric pressure in a high vacuum by measuring a temperature difference between a region A (48) and a region B (49). That is because, when the thin film 10 is heated by the heater 25 provided in the region A (48), heat from the region B (49) is not thermally conducted in a high vacuum except radiation since the thin film 10 has a configuration of a cantilever 46 and the region B (49) is placed on the distal end side of the cantilever 46 with respect to the region A (48). Therefore, the temperature difference between the region B (49) and the region A (48) approximates zero. When the temperature sensors 20 provided in the region B (49) and the region A (48) are the thin-film thermocouples 120, the temperature difference between the region B (49) and the region A (48) can be highly accurately measured. A state that the temperature difference becomes zero means that a high-vacuum side can be highly accurately measured by utilizing a null-balance method.

On the other hand, in the thermal barometric sensor according to the present invention, even under an atmospheric pressure close to 1 atmosphere or higher atmospheres, the thin film (10) has a double structure having different thermal expansion coefficients, whereby the thin film (10) subjected to bending deformation, vibration and heating is forcibly cooled based on expansion/contraction of the double structure in heating/cooling of the heater 25 to expand and measure the temperature difference between the region A (48) and the region (49) so that an atmospheric pressure can be measured based on this degree of cooling.

Since the heat transfer coefficient differs depending on a type and a temperature of a gas as the measurement target fluid, the type of the gas is grasped beforehand and a temperature at the time of measurement is measured, and an indication value of the standard gas is corrected based on these pieces of information in conventional examples, but the thin film 12 which is independent from the thin film 10, thermally separated from the substrate 1, and has the temperature sensor 20 is provided in close proximity to the thin film 10 having the heater 25 mounted thereon, information concerning the heat transfer coefficient of the gas at that moment is obtained under the same atmospheric pressure as the standard gas based on temperature information obtained from an output from the thin film 12, temperature information of the measurement target gas, and temperature output information of the thin film 10, and the obtained information is compared with data of the standard gas acquired using the thermal barometric sensor in advance to perform automatic calibration using the calibration circuit means 200 in the thermal barometric sensor according to the present invention. It is to be noted that, like the thermal flow sensor, the type of the gas can be specified by variously changing a temperature of the heater 25 by the temperature changing means 250 of the heater 25 to enable measurement of the temperature dependence of the heat transfer coefficient of the gas as the measurement target fluid.

In the thermal barometric sensor according to claim 14 of the present invention, the temperature sensor (20) of the thin film (12) is a thin-film thermocouple (120), and it is used for atmospheric pressure measurement of an atmospheric pressure that is both greater and not greater than 1 pascal (Pa) by utilizing a nature that the thin film (12) receives heat from the heater (25) only through a gas as the measurement target fluid to raise its temperature and measuring a temperature difference from the substrate (1) using the thin-film thermocouple (120).

When a high vacuum (a low atmospheric pressure) is formed, the number of gas molecules is greatly reduced, and an amount of heat removal from a surface of a heated object is dynamically decreased. Since the thermal barometric sensor is based on the principle of measuring a change in temperature in accordance with an amount of heat removal provided by the gas molecules, it is difficult to measure an atmospheric pressure under a low atmospheric pressure with a small number of molecules. The thermocouple measures a temperature difference between a cold junction and a hot junction alone, and hence thermal electromotive force essentially becomes zero if the temperature difference is zero. A method for performing measurement based on this zero output is the null-balance method, it can achieve highly accurate measurement. In the present invention, since the hot junction of the thin-film thermocouple 120 of the thin film 12 provided in proximity to the heated heater 25 is heated only through the measurement target gas, the present invention is very sensitive to a pressure of the gas. Even if an ambient temperature changes, when a temperature of the heater 25 is increased from a temperature of the substrate 1 predetermined fixed degrees, a temperature rise of the hot junction of the thin-film thermocouple having the cold junction on the substrate 1 with a high heat capacity is achieved by heating the heater 25 only through the measurement target gas and hence directly relates to presence of gas molecules, i.e., an atmospheric pressure, thereby applying the null-balance method to highly accurately measure the atmospheric pressure. In this manner, according to the present invention, the thin film 12 is used not only for calibration of a type or a temperature of a gas in atmospheric pressure measurement but it is also used as a vacuum sensor (a barometric sensor) in high vacuum.

Effect of the Invention

The heat conduction-type sensor according to the present invention comprises at least two thin films, i.e., a thin films 10 (having a thin-film heater and a temperature sensor mounted thereon) thermally separated from a substrate and a thin film 12 (having a temperature sensor mounted thereon) under specified conditions such as a heating temperature of a predetermined heater, electric power, and others, these thin films are arranged in proximity to each other to exchange heat only through a measurement target fluid, and hence this sensor has an advantage that effects of a type and a temperature of the measurement target fluid can be automatically calibrated to indicate a flow velocity or a mass flow detected by the thermal flow sensor and an atmospheric pressure detected by the thermal barometric sensor by comparing data (information) concerning a heat transfer coefficient previously measured using a standard gas under the same conditions and data concerning a heat transfer coefficient of the unknown measurement target fluid.

An amplification circuit, an arithmetic circuit, or a control circuit which is a primary element as calibration circuit means 200 configured to eliminate effects of a temperature and a type of the measurement target fluid can be incorporated in a semiconductor sensor chip of the heat conduction-type sensor, thereby performing automatic calibration. Furthermore, electrode pads such as an electrode pad of the heater 25 provided on the semiconductor sensor chip, an electrode pad of the temperature sensor 20, an electrode pad of an absolute temperature sensor for measuring an absolute temperature of the substrate 1, and others can be wired to a package having the semiconductor sensor chip mounted thereon by wire bonding or the like without incorporating the calibration circuit means 200 in the semiconductor chip, and the calibration circuit means 200, e.g., the arithmetic circuit or the control circuit can be provided in the packaged heat conduction-type sensor. Moreover, the calibration circuit means 200 may be formed outside the heat conduction-type sensor. In this case, a terminal for the calibration circuit means is fabricated in the heat conduction-type sensor in advance to enable communication with the calibration circuit means provided outside through this terminal. In this manner, since the very compact heat conduction-type sensor can be manufactured, there can be obtained an advantage that the compact thermal flow sensor or thermal barometric sensor that can automatically calibrate effects of a temperature and type of the measurement target fluid can be provided.

Since the heat conduction-type sensor according to the present invention uses the thin-film thermocouple 120 as the temperature sensor 20, it is preferable for measuring a temperature rise of the thin film 10 or the thin film 12 when heated by the heater.

In the heat conduction-type sensor according to the present invention, since the thin film 10, the thin film 12, the thin film 11, and the coupling thin film 13 are formed of the SOI layer, utilizing single-crystal properties of this layer enables easily forming a diode, a transistor, a thin-film thermocouple, a resistive element, and others in this region, and hence there can be obtained an advantage that an integrated circuit can be formed or a thin film floating in midair can be readily formed by utilizing a difference in etchant between a buried insulator layer (a BOX layer) and the SOI layer.

The thermal flow sensor according to the present invention has a configuration that the thin film 10 thermally separated from the substrate includes the heater 25, the thin film 11 including the thin-film thermocouple 120 is arranged in proximity to the thin film 10, and a region of the hot junction 81 of the thin-film thermocouple 120 is coupled with the maximum temperature region 85 of the thin film 10 through the coupling thin film 13 having thermal resistance. Therefore, since the coupling thin film 13 has a heat transfer coefficient sufficiently higher than a heat transfer coefficient of the measurement target fluid such as a gas or a liquid, a type of the measurement target fluid or the heat transfer ratio having temperature dependence can be substantially ignored. In particular, if correction (calibration) of an ambient temperature can be ignored or the correction is required, its effects can be greatly lessened, and the calibration circuit means constituted of a simple calibration circuit can suffice, thereby obtaining an advantage that the small and inexpensive thermal flow sensor can be provided.

The thermal flow sensor according to the present invention has an advantage that a degree of thermal resistance of the coupling thin film 13 as a thermal resistance region 47 can be adjusted by adjusting a width, a length, or a thickness of this thin film or by selecting a material of the same as required.

The thermal barometric sensor according to the present invention also has an advantage that a change in temperature of the thin film 12 in the unknown measurement target fluid and that in a known standard gas are compared and measured under the same predetermined atmospheric pressure such as an air pressure and the same temperature by utilizing a change in temperature of the thin film 12 comprising the thin-film thermocouple 120 arranged in proximity to the thin film 10 having the heater 25 formed thereon, and respective heat transfer coefficients or a ratio of these coefficients is calculated, whereby an error of an atmospheric pressure of the measurement target fluid caused due to a temperature or a type of the measurement target fluid can be automatically calibrated using the calibration circuit means 200.

The thermal barometric sensor according to the present invention has an advantage that the calibration thin film 12 including the thin-film thermocouple 120 can be used for an increase in sensitivity of the barometric sensor in a high-vacuum region.

EXPLANATIONS OF LETTERS OR NUMERALS

Figure 1:
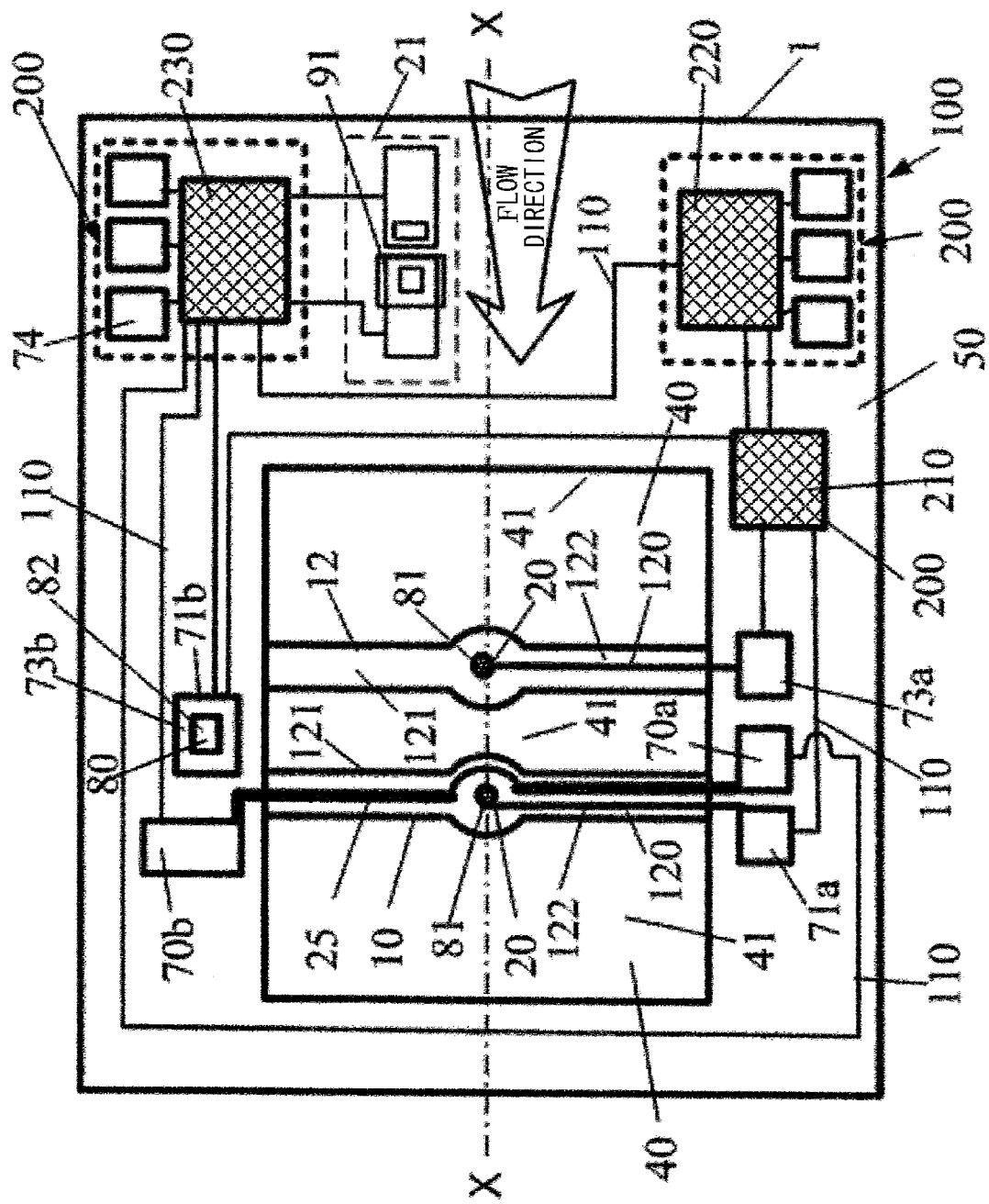
FIG. 1 is a plan schematic view of a heat conduction-type sensor chip showing an example of a heat conduction-type sensor according to the present invention (Example 1), (Example 2)

1 substrate
10, 11, 11*a*, 11*b*, 12 thin film
13, 13*a*, 13*b* coupling thin film
15 underlying substrate
16 SOI layer
20 temperature sensor 21 absolute temperature sensor
25 heater
40 cavity
41 slit
46 cantilever
47 thermal resistance region
48 region A
49 region B
50 silicon oxide film
51 BOX layer
61 n-type region
62 p-type diffusion region
70, 70a, 70b electrode pad
71a, 71b electrode pad
72a, 72b electrode pad
73a, 73b electrode pad
74 electrode pad
75 calibration circuit terminal
76 calibration circuit terminal
80 contact hole
81 hot junction
82 cold junction
85 maximum temperature region
90 discrete insulation groove
91 pn junction
100 heat conduction-type sensor chip
101 thermal flow sensor chip
102 thermal barometric sensor chip
110 wiring line
120, 120a, 120b, 120c thin-film thermocouple
121 thermocouple conductor
122 thermocouple conductor
200 calibration circuit means
210 amplifier
220 arithmetic circuit
230 control circuit
250 temperature changing means
300 package
310 printed substrate
320 flow tube
321 flow tube narrowed portion
325 flow path
330 external output terminal
350 cable
400 modularized thermal flow sensor
500 housing of calibrating means

BEST MODE(S) FOR CARRYING OUT THE INVENTION

A heat conduction-type sensor according to the present invention and a thermal flow sensor and a thermal barometric sensor each having characteristics of this heat conduction-type sensor can be easily formed on a silicon (Si) substrate which is especially an SOI substrate on which an IC can be also formed by using matured semiconductor integration technology and MEMS technology. Manufacture of the heat conduction-type sensor, the thermal flow sensor, and the thermal barometric sensor using the SOI substrate, which is the silicon (Si) substrate will now be described hereinafter in detail based on examples with reference to the drawings.

Example 1

Figure 2:
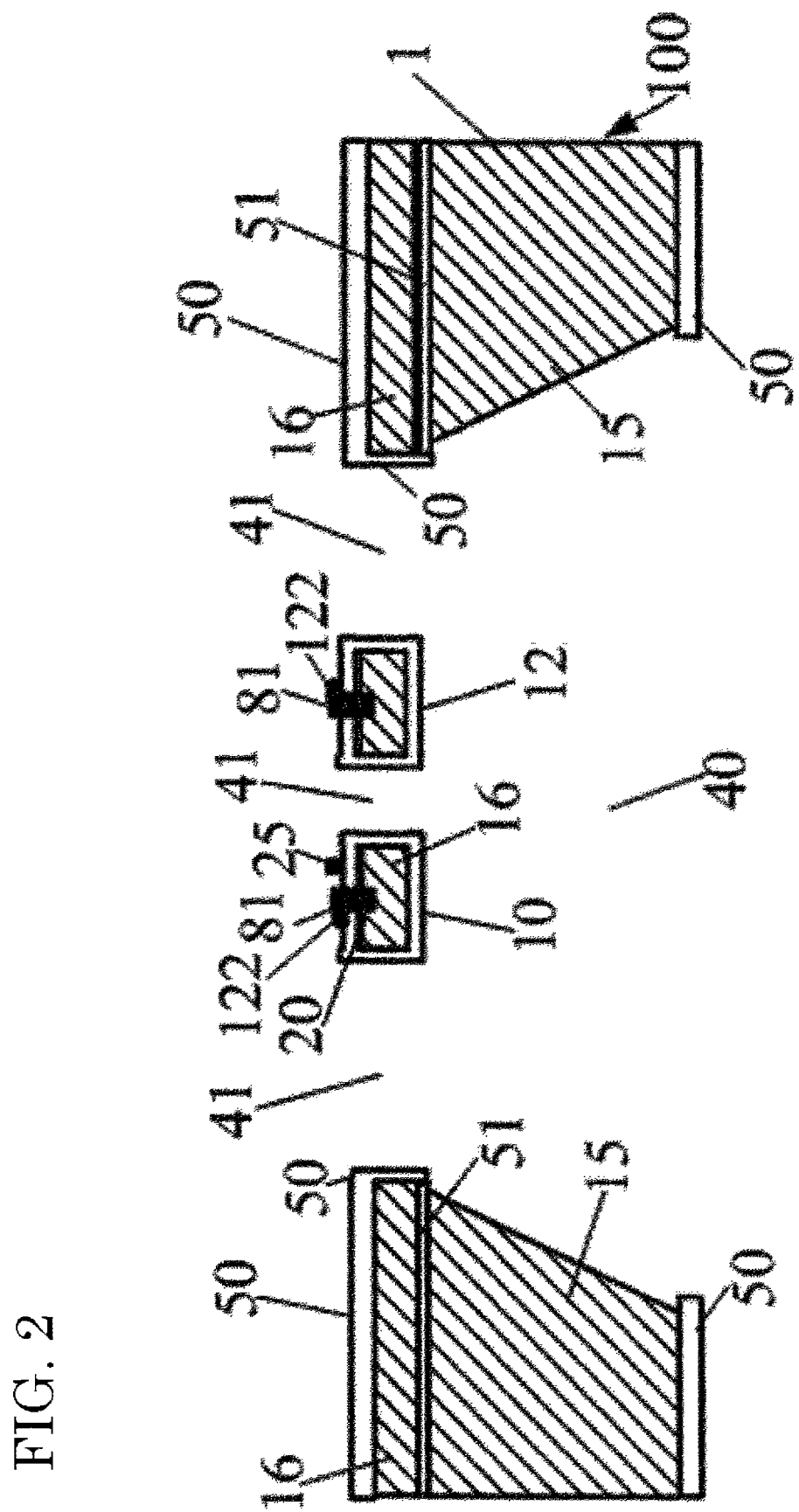
FIG. 2 is a cross-sectional schematic view taken along a line X-X in FIG. 1 (Example 1), (Example 2)

FIG. 1 is a plan schematic view of a sensor chip showing an example of a heat conduction-type sensor according to the present invention, and FIG. 2 is a cross-sectional schematic view taken along a cross section X-X. In this example, a semiconductor silicon substrate 1 is used as a heat conduction-type sensor according to the present invention, and there is shown an example that an amplifier 210, an arithmetic circuit 220, and a control circuit 230 which are primary parts as calibration circuit means 200 for calibrating effects of a type or a temperature of a measurement target fluid are formed and provided on this substrate 1. Further, this is a situation where an SOI substrate as the substrate 1 is used and applied to a thermal flow sensor but it can be likewise embodied as a thermal barometric sensor as it is.

In the SOI substrate as the substrate 1, since a BOX layer 51 as a buried insulating layer is present below an SOI layer 16, the SOI layer 16 or an underlying substrate 15 made of single-crystal silicon is dissolved (etched) in, e.g., a hydrazine aqueous solution which is an alkaline etchant, but the BOX layer 51 is not etched, and hence a thin-film structure which is thermally separated from the substrate 1 and floating in midair is formed. A thin film 10 having one heater 25 and a thin-film thermocouple 120 as a temperature sensor 20 formed thereon and a thin film 12 having a thin-film thermocouple 120 as the other temperature sensor 20 formed thereon are formed in close proximity (e.g., approximately 50 micrometers at the most proximal position) by utilizing this technology adopting the SOI layer 16 as a main constituent material. Furthermore, a slit 41 is formed by anisotropic etching from the SOI layer 16 side, and a cavity 40 is formed by the anisotropic etching from a back surface of the substrate 1. At this time, the thin film 10 and the thin film 12 which are the thin films floating in midair as regions surrounded and protected by a silicon oxide film 50 and the BOX layer 51 are formed as bridge structures each having supporting portions on both side surfaces facing the cavity 40 with respect to the substrate 1. Here, a nichrome thin film that can resist the alkaline etchant is used for metal wiring lines 110, electrode pads 70, 71, 73, and the likes, and one thermocouple conductor 122 constituting the thin-film thermocouple 120.

In this example, the thin-film thermocouple 120 is used as the temperature sensor 20, and the thin film 10 is also provided with the heater 25 and the temperature sensor 20 for measuring a temperature of the thin film 10 (which will be referred to as a heater temperature hereinafter). The thin-film thermocouple 120 is a temperature difference sensor, thermal electromotive force is determined based on a temperature difference between a hot junction 81 and a cold junction 82 irrespective of an ambient temperature and others, which is preferable. Here, since the thin-film thermocouple 120 is used as the temperature sensor 20, in regard to a temperature difference between the hot junctions 81 of the thin film 10 and the thin film 12, measuring a thermal electromotive force difference between an electrode pad 71a and an electrode pad 73a can suffice. Here, in regard to the thin-film thermocouples 120 formed on the thin film 10 and the thin film 12, the SOI layer 16 constituting the thin film 10 and the thin film 12 is used for one thermocouple conductor 121, a nichrome thin film that can resist the anisotropic etching is used for the other thermocouple conductor 122, and the same material is used for the electrode pads 71a and 73a and the wiring lines 110. Furthermore, the cold junction 82 of the thin-film thermocouples 120 formed on the thin film 10 and the thin film 12 is used as a common terminal.

This example is an example that the amplifier 210, the arithmetic circuit 220, and the control circuit 230 as primary parts of the calibration circuit means 200 are formed on the silicon semiconductor substrate 1, and the two thin-film thermocouples 120 which are the heater 25 or the temperature sensor 20 and the respective electrode pads for an absolute temperature sensor 21 formed of a pn junction are prepared, whereby signals can be transmitted between these respective electrode pads and the amplifier 120, the arithmetic circuit 220, and the control circuit 230 through the wiring lines 110, these signals can be output to the outside, or electric power can be supplied to the heater 25.

An operation of the head conduction-type sensor according to the present invention will now be described with reference to FIG. 1 and FIG. 2 of this example where this sensor is applied to a simple thermal flow sensor. When a current is flowed through the heater 25 provided on the thin film 10 and a state that, e.g., an unknown gas as a measurement target fluid has no flow can be achieved, a thermal flow sensor chip is exposed to a room temperature (e.g., 20° C.) under an atmospheric pressure (1 atmosphere). It is assumed that a temperature rise ΔTu of the heater 25 (which is actually a temperature rise of the thin-film thermocouple 120 as the temperature sensor formed on the thin film 10) is 12° C. when the heater 25 is driven by predetermined power, e.g., 10 [mW]. The room temperature 20° C. which is a temperature of the fluid (here, a gas is taken as an example) can be known by using the absolute temperature sensor 21 utilizing the pn junction formed on the thermal flow chip sensor. It is assumed that, when the heater 25 is driven by the predetermined same power, e.g., 10 [mW] mentioned above in a standard gas (e.g., a nitrogen ($N_2$) gas), a temperature rise ΔTs is 10° C. It can be understood from Newton's law of cooling in Expression 1 that a difference between 12° C. as the temperature rise of the heater 25 in the unknown gas and 10° C. as the temperature rise in the standard gas under the same conditions is based on heat transfer coefficients of these gases at this temperature. Moreover, in general, it is known that a temperature rise of a heater driven by fixed power is in inverse proportion to thermal conductance G of heat transfer to a fluid and the thermal conductance G is in proportion to a heat transfer coefficient h of this fluid. Therefore, in a simple sense, a heat transfer coefficient $h_u$ of the unknown gas at the same room temperature (here, 20°) is a value obtained by multiplying a heat transfer coefficient $h_s$ of the standard gas by ΔTs/ΔTu. Since the heat transfer coefficient $h_s$ of the standard gas at a predetermined temperature is known and ΔTs/ΔTu can be obtained by measurement, the heat transfer coefficient $h_u$ of the unknown gas can be revealed, and a flow velocity or a mass flow of the thermal flow sensor can be obtained based on this value by using Expression 1 or Expression 3. It is to be noted that a in Expression 3 is associated with the heat transfer coefficient h of each of these gases as described above (actually, a product obtained by a heating effective surface area A of a heater portion which is substantially a constant). When the thin-film thermocouple 120 is used as the temperature sensor 20 provided on the thin film 10 or the thin film 12 in such a gas, a temperature rise from an ambient temperature alone is measured, which is preferable.

Although a temperature of the unknown gas as the measurement target fluid and the heat transfer coefficient $h_s$ of the standard gas are data obtained at the same temperature in the above description, when the temperature differs, data of the heat transfer coefficient $h_s$ of the standard gas at a measured temperature of the unknown gas is estimated and calculated based on collinear approximation in advance, and the heat transfer coefficient $h_u$ of the unknown gas at this temperature can be obtained based on the calculated data.

Moreover, the thin-film thermocouple 120 as the temperature sensor 20 of the thin film 12 provided at a position apart from the thin film 10 a fixed distance is exposed to a temperature that is exponentially decaying as substantially distanced from the heater 25, and a temperature of the thin-film thermocouple 120 can be determined and approximated by a distanced at the position of the thin film 12. Additionally, when the thin film 10 and the thin film 12 are arranged in proximity, since the thin film 12 is heated by heat from the thin film 10 through a heat transfer coefficient of the ambient gas, a difference between a temperature of the heater 25 and a temperature of the thin film 12 can be approximated to be substantially in inverse proportion to the heat transfer coefficient of the ambient gas if the temperature of the heater 25 is maintained at a predetermined fixed temperature rise and a distance (a gap) between the thin film 10 and the thin film 12 is fixed and very small. Therefore, a temperature difference between the thin film 10 and the thin film 12 is measured as a temperature fall of the thin film 12 from a temperature of the heater 25, and the known heat transfer coefficient $h_u$ of the unknown gas at that temperature can be obtained by utilizing the known heat transfer coefficient $h_s$ from comparison with a temperature difference between the thin film 10 and the thin film 12 in the standard gas.

When measuring a flow velocity or a mass flow as a physical state of the measurement target fluid by the thermal flow sensor, in a state that the fluid does not have a flow at that temperature, it can be determined that a ratio $r=(h_s/h_u)$ of the known heat transfer coefficient $h_s$ of the standard gas and the heat transfer coefficient $h_u$ of the unknown gas at that temperature is equal to an inverse number (ΔTu/ΔTs) of a ratio of a temperature difference (Tw−Tb)=ΔTs between a temperature Tw of the thin film 10 and a temperature Tb of the thin film 12 in the standard gas and a temperature difference (Tw−Tb)=ΔTu between the same in the unknown gas in case of the standard gas and the gas as the unknown measurement target fluid. Since the respective temperature differences ΔTs and ΔTu can be obtained from output differences from the thin-film thermocouples 120 provided on the thin film 10 and the thin film 12, $(h_s/h_u)$ can be obtained as a numerical value after all. In general, a temperature difference between the thin film 10 and the thin film 12 is small in case of a gas having a high heat transfer coefficient at the same temperature like a hydrogen gas or a helium gas, and a heat transfer coefficient is low and hence a temperature difference between the thin film 10 and the thin film 12 is large in a gas having a high molecular weight like an argon gas or a xenon gas. In this manner, for example, a nitrogen gas can be used as the standard gas, $(h_s/h_u)$ of any other unknown gas at that temperature can be calculated, and the thermal flow sensor can correct (calibrate) an output error in indication of a flow velocity or a mass flow from the standard gas due to a difference in gas type. When the measurement target fluid has a flow, its value becomes high and changes, but the ratio $(h_s/h_u)$ of these gases is approximated to hardly change even though there is a flow. Although there are various methods for taking out an output signal for indication of a flow velocity or a mass flow as the thermal flow sensor, it is possible to use a change in power (a product of a heater supply current and a voltage) supplied to the heater 25 required to maintain a temperature of the thin film 10 of the heat conduction-type sensor in FIG. 1 at 12° C. constant in a mass flow (or a flow velocity) of the gas when the gas as the measurement target fluid has a flow, or use a temperature difference between a thin film 11 coupled with the thin film 10 having the heater 25 and the thin film 10 or a temperature difference between a thin film 11a on the upstream side coupled with the thin film 10 having the heater 25 and a thin film 11b on the downstream side for a thermal electromotive force difference between a thin-film thermocouple 120a and a thin-film thermocouple 120b. Therefore, the indication of an actual flow velocity or mass flow can be calibrated by utilizing an output signal for indication of such a flow velocity or a mass flow or ($h_s/h_u$) previously calculated by using the standard gas based on experimental data.

A signal from the absolute temperature sensor 21 formed on the semiconductor substrate 1 of the thermal flow sensor chip is used in regard to an absolute temperature of the measurement target fluid, and a thermal electromotive force signal from the thin-film thermocouple 120 (the electrode pads 71a and 71b) as the temperature sensor 20 formed on the thin film 10 and a thermal electromotive force signal from the thin-film thermocouple 120 (the electrode pads 73a and 73) as the temperature sensor 20 formed on the thin film 12 are supplied to and processed in the control circuit 230, the amplification circuit 210, and the arithmetic circuit 220 as part of the calibration circuit means 200 formed on the semiconductor substrate 1 of the thermal flow sensor chip to in regard to measurement of heating supply power of the heater 25 (supply power for the electrode pads 70a and 70b of the heater 25), thereby correcting (calibrating) effects of a type of the measurement target fluid and effects of a temperature. At this time, the control circuit 230 enables control over a predetermined temperature rise of the heater 25, predetermined power supply control, and control over a heating temperature of the heater, the amplification circuit 210 amplifies the thermal electromotive signals from the thin-film thermocouples 120, and the arithmetic circuit 220 calculates a ratio of the known heat transfer coefficient $h_s$ of the standard gas and the heat transfer coefficient $h_u$ of the unknown gas at that temperature and uses it for correcting (calibrating) the effects of a type of the measurement target fluid and the effects of a temperature, thereby enabling indication of a true value of a flow velocity or a mass flow of the unknown gas. Furthermore, temperature dependence of the heat transfer coefficient $h_u$ of the unknown gas is also measured by changing a heater temperature using the temperature changing means 250, and the temperature dependence of the heat transfer coefficient $h_u$ is added, whereby the unknown gas can be correctly specified.

As can be understood from Expression 3 of King's law, a constant a in the expression is actually associated with the heat transfer coefficient h of the fluid, and both this a and density r differ depending on a temperature of the fluid and have the temperature dependence. Therefore, when using data, e.g., the heat transfer coefficient h of the standard gas to calibrate the flow velocity or the mass flow as a physical state of the unknown gas, using values obtained at the same temperature to perform calibration is important. As described above, when data of the heat transfer coefficient h and others of the standard gas does not have data obtained at a temperature of the measurement target fluid in an environment where measurement is actually performed, data of the standard gas obtained at a temperature close to that temperature can be estimated and used based on collinear approximation. Additionally, supply power P of the heater 25 can be controlled by the control circuit 230 of the calibration circuit means 200 to maintain the temperature difference (Tw−Tb) between the temperature Tw of the heater 25 and the temperature Tb of the thin-film thermocouple 120 provided in the thin film 12 by using the standard gas, e.g., a nitrogen gas to variously change a mass flow component (rV) at a predetermined temperature based on Expression 3 in regard to the thermal flow sensor in advance, data of a relationship between P and the mass flow component (rV) can be thereby acquired, a predetermined temperature of the measurement target fluid can be changed to form data of the relationship between the supply power P and the mass flow component (rV) at each predetermined temperature, and data of values of a and b in Expression 3 at various temperatures of the measurement target fluid can be further formed so that it can be used for calibration of the unknown gas.

Example 2

The heat conduction-type sensor chip 100 shown in FIG. 1 and FIG. 2 in the foregoing example can be used and embodied as a simple thermal barometric sensor. A description will be given as to an example that the heat conduction-type sensor depicted in FIG. 1 and FIG. 2 of the present invention is embodied as the thermal barometric sensor. In the thermal barometric sensor, as different from the application to the thermal flow sensor in Example 1, even if a measurement target fluid has no flow or if it has a flow, a mesh cover or the like is directly disposed to a thin film 10 and a thin film 12 as sensing portions of a sensor chip so that an air current cannot reach these films, and measurement is carried out in a state that the flow is blocked. Therefore, when embodying this thermal barometric sensor, the above Expression 1 is applied. Further, a heat transfer coefficient h of a gas is a function of a type and a temperature Ta of the gas and an atmospheric pressure. First, a temperature Tb of the thin film 12 is measured in a steady state while controlling a temperature Tw (a heater temperature) of the thin film 10 under 1 atmosphere in a standard gas (e.g., a nitrogen gas) by a control circuit 230 so that (Tw−Ta) becomes a fixed value 100° C. by heating of the heater 25 at a temperature Ta (e.g., 20° C.). A magnitude of (Tw−Tb) at this moment can be approximated to be in inverse proportion to a heat transfer coefficient $h_s$ of the standard gas, which is a fluid filling a space between the thin film 10 and the thin film 12 arranged in proximity, at the ambient temperature between the thin film 10 and the thin film 12. Furthermore, the heat transfer coefficient $h_s$ of the standard gas at each of various ambient temperatures Ta is calculated and provided in a database. Then, an unknown gas is actually used in place of the standard gas to likewise calculate the heat transfer coefficient $h_u$ under 1 atmosphere at the ambient temperature Ta, and a ratio $r=(h_s/h_u)$ of the heat transfer coefficient $h_s$ of the standard gas and the heat transfer coefficient $h_u$ of the unknown gas at that temperature is obtained in advance like Example 1. This ratio r is used as a correction coefficient at this temperature, and this value is used to correct (calibrate) a value of an atmospheric pressure of the unknown gas at that temperature like the thermal flow sensor. It is to be noted that, since this ratio r differs to some extent depending on a level of a temperature Ta of the measurement target fluid (the ambient temperature), the ambient temperature Ta can be measured by an absolute temperature sensor 21 provided in the thermal barometric sensor chip and the ratio r at this temperature can be used to perform the correction.

Although the temperature difference (Tw−Tb) between the thin film 10 an the thin film 12 is used while maintaining the temperature difference (Tw−Ta) between the thin film 10 and the surrounding fluid constant in the above description, heating power P of a heater required for maintaining the temperature difference (Tw−Ta) between the thin film 10 and the surrounding fluid constant can be compared so that a ratio of the heating power P of the heater in the standard gas and that in the unknown gas can be used. However, since the temperature difference (Tw−Tb) between the thin film 10 and the thin film 12 has a small value, a rate of change is thereby increased, and using (Tw−Tb) enables performing the calibration with higher sensitivity.

Although the description given as to the experiment of the thermal barometric sensor that the ambient temperature of the standard gas is changed to create the database, changing the ambient temperature of the standard gas is generally difficult. The fluid between the thin film 10 and the thin film 12 arranged in proximity is heated by the heater to have a high temperature under a pressure close to 1 atmosphere, and hence the heat transfer coefficient h at this temperature is different from the ambient temperature Ta as a low temperature. Therefore, in measurement of the temperature difference (Tw−Tb) between the thin film 10 and the thin film 12, the heat transfer coefficient h of the fluid at an average temperature between the thin film 10 and the thin film 12 should be actually used as this heat transfer coefficient h of the fluid. Conversely, the temperature Tw of the thin film 10 (which is determined as a temperature of the heater 25) is changed, and the heat transfer coefficient h of the fluid at a temperature close to this temperature can be thereby calculated by measuring (Tw−Tb). In this manner, the predetermined temperature Tw of the heater 25 is changed, the heat transfer coefficient $h_s$ of the standard gas under 1 atmosphere at each temperature is calculated and provided in the database, and (Tw−Tb) at the temperature Tw is measured, whereby the heat transfer coefficient $h_u$ of the unknown gas can be calculated and corrected (calibrated). It is to be noted that a type of the unknown gas can be specified from the heat transfer coefficient $h_u$ of the unknown gas at a specific temperature or its temperature dependence. Conversely, it is needless to say that, if this unknown gas can be specified, it is no longer unknown, an existing database of this gas can be used to automatically configure a flow velocity or a mass flow.

Example 3

Figure 3:
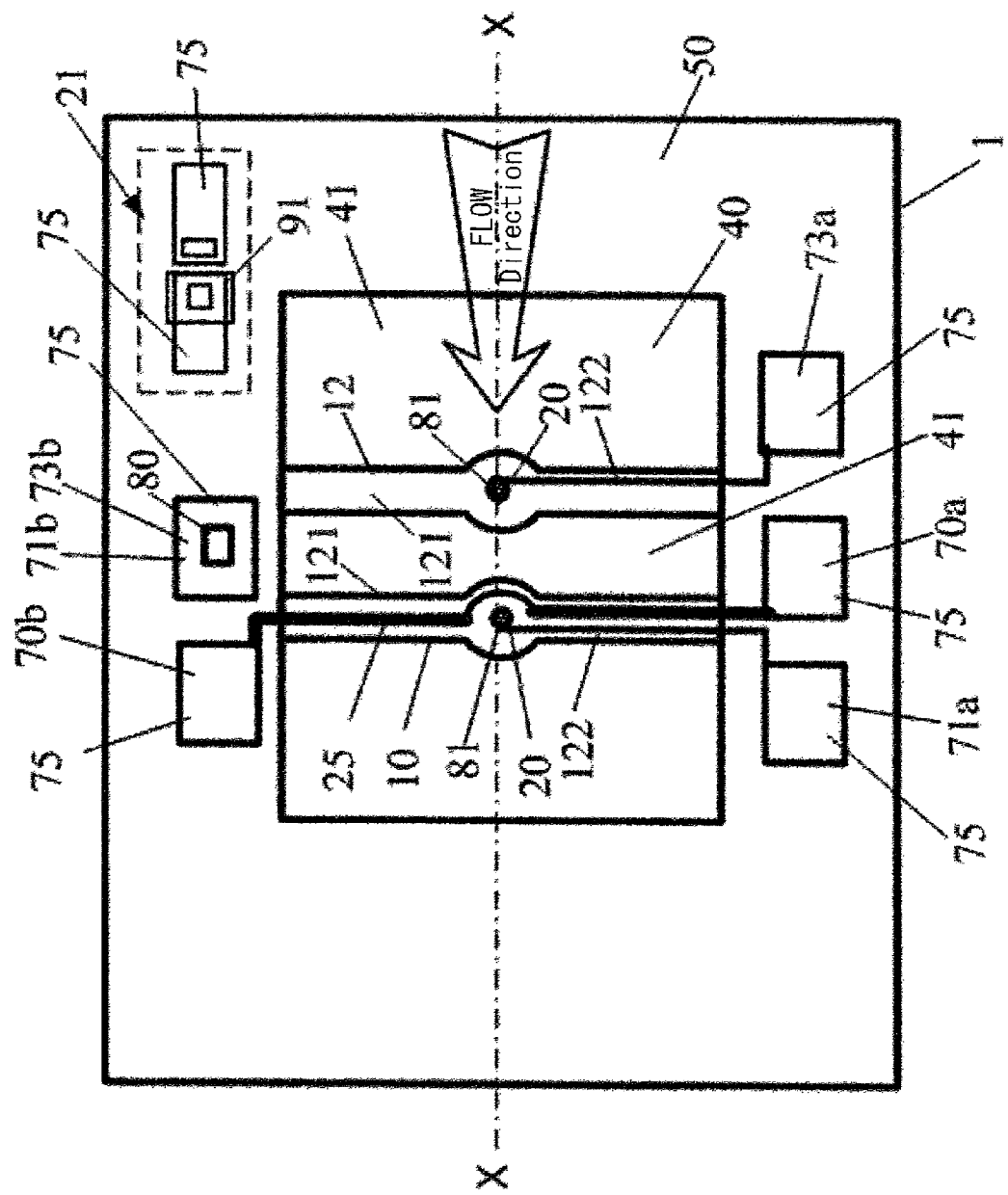
FIG. 3 is a plan schematic view of a heat conduction-type sensor chip showing another example of the heat conduction-type sensor according to the present invention (Example 3)
Figure 4:
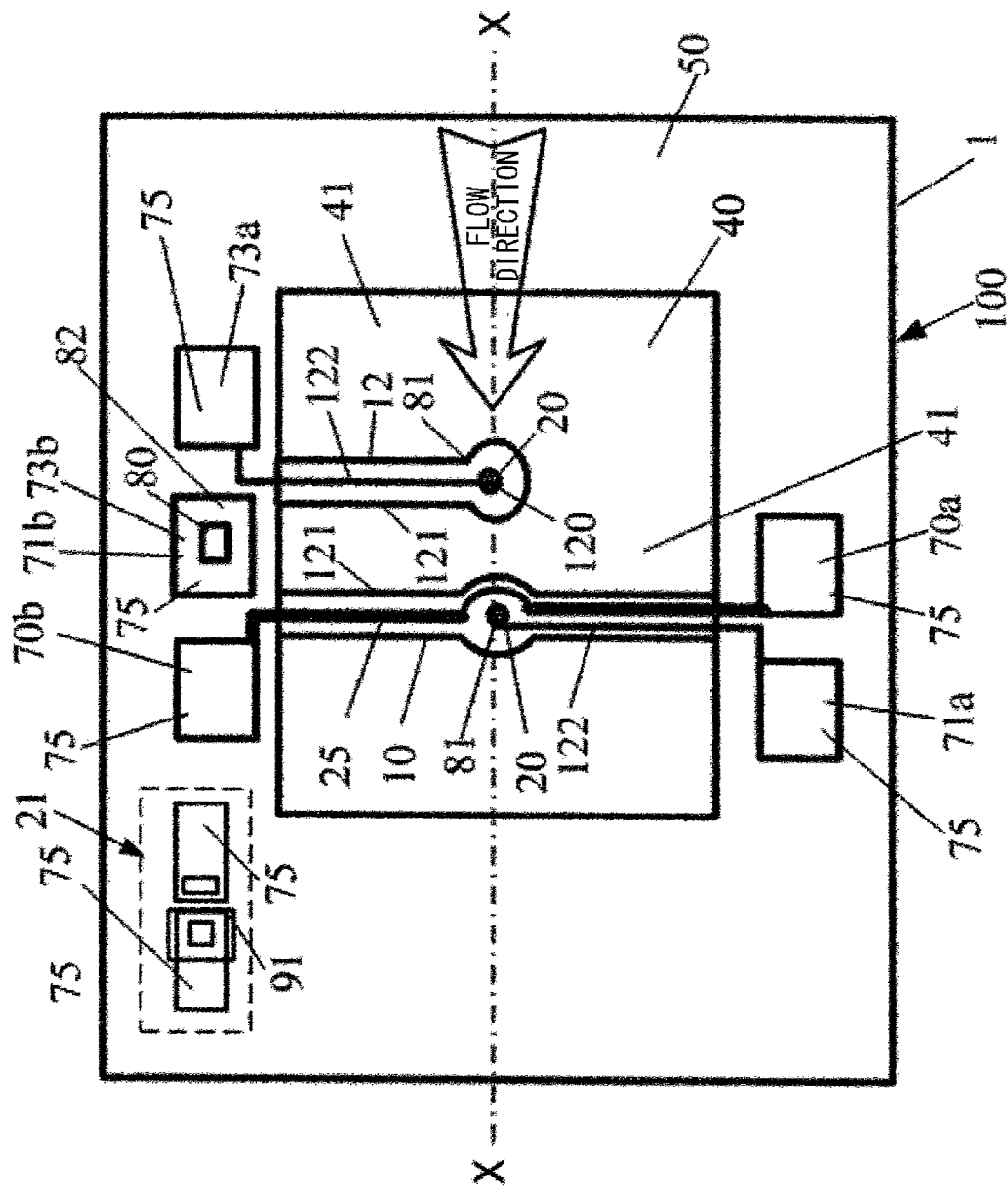
FIG. 4 is a plan schematic view of a heat conduction-type sensor chip showing still another example of the heat conduction-type sensor according to the present invention (Example 3)
Figure 5:
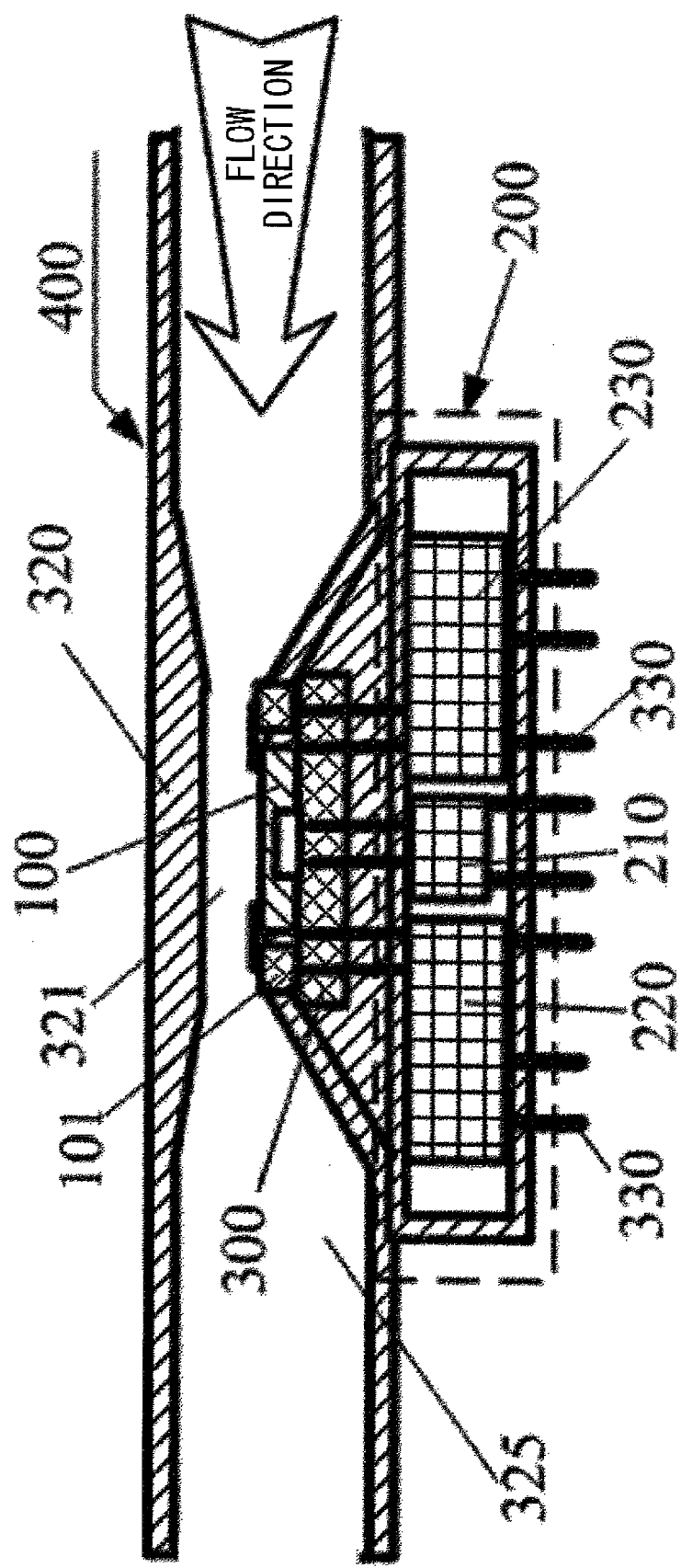
FIG. 5 is a cross-sectional schematic view of a thermal flow sensor modularized by incorporating calibration circuit means showing an example that the heat conduction-type sensor according to the present invention is applied to the thermal flow sensor (Example 3)
Figure 6:
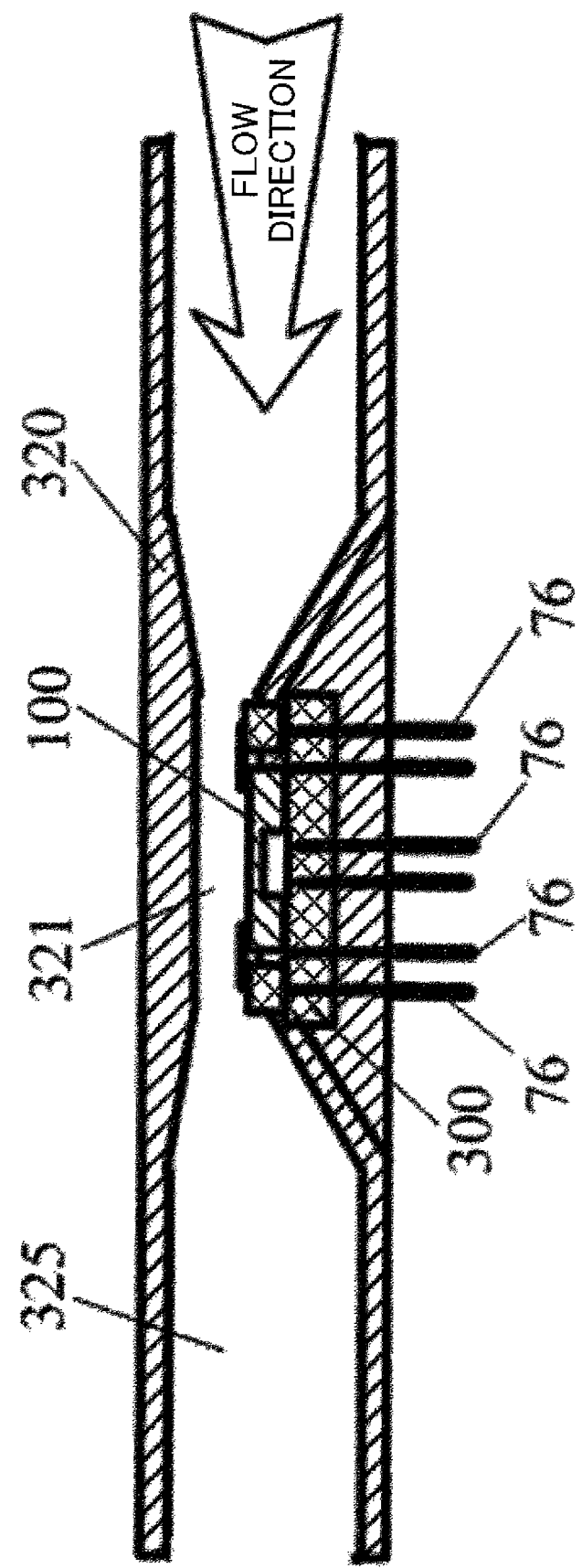
FIG. 6 is a transverse cross-sectional schematic view showing another example of the thermal flow sensor according to the present invention when a sensor chip is mounted and disposed in a flow tube (Example 3)
Figure 7:
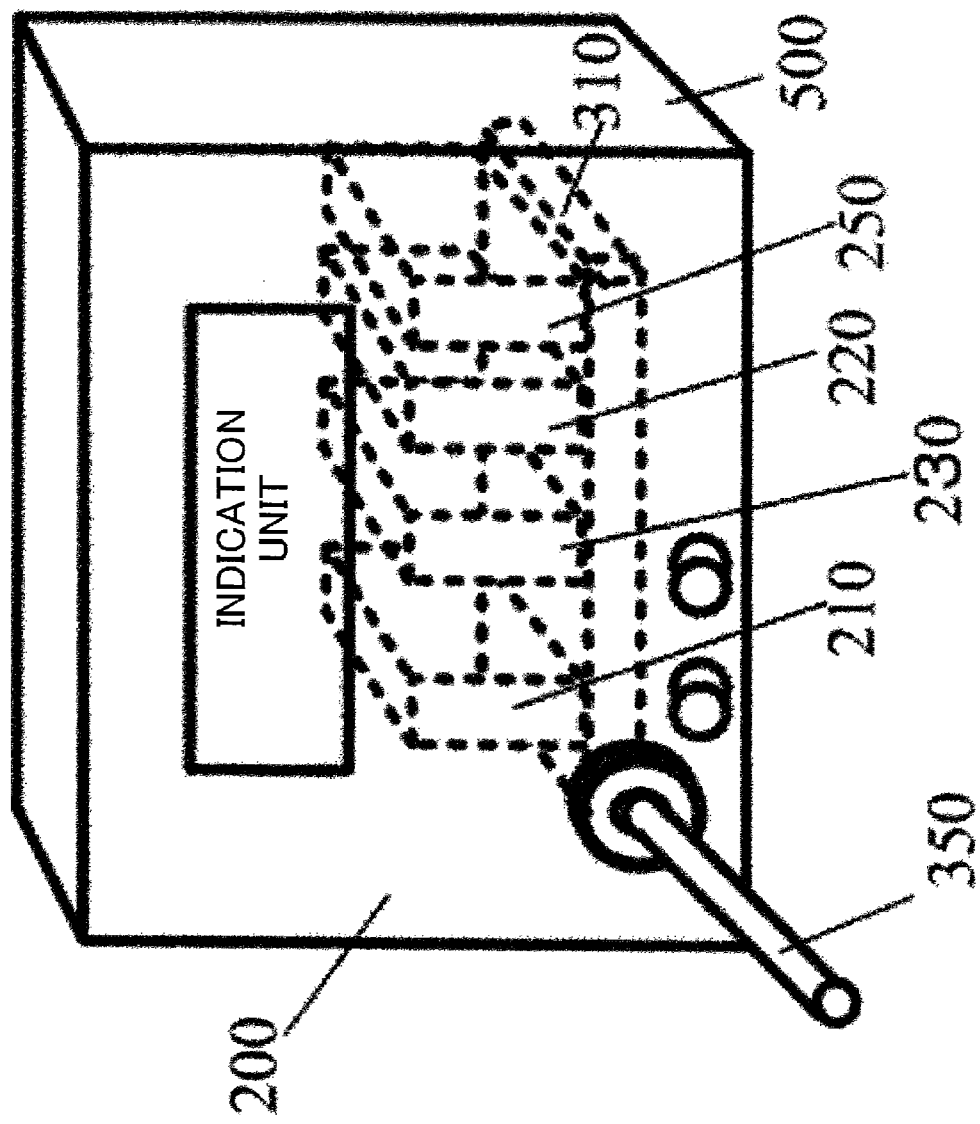
FIG. 7 is a transverse cross-sectional schematic view showing an example of a calibration circuit provided outside the heat conduction-type sensor according to the present invention (Example 3)

FIG. 3 is a plan schematic view of a heat conduction-type sensor chip showing another example of the heat-conduction type sensor according to the present invention in which an amplifier 210, an arithmetic circuit 220, and a control circuit 230 as primary parts of a calibration circuit means 200 are provided outside rather than being formed on the heat conduction-type sensor chip 100, but instead respective electrode pads 70a, 70b, 71a, 71b, and others are provided on the heat conduction-type sensor chip 100 in such a manner that they can be also used as calibration circuit terminals 75 for the calibration circuit means 200 provided outside to enable supply/reception of power or communication with the calibration circuit means 200 provided outside. Further, as different from the example of the heat conduction-type sensor chip 100 depicted in FIG. 3, FIG. 4 shows that a thin film 12 is constituted of a cantilever 46 and has a hot junction 81 of a thin-film thermocouple 120 as a temperature sensor 20 at an end portion thereof, and a cold junction 82 common to a thin-film thermocouple 120 as the temperature sensor 20 of a thin film 10 is formed on a semiconductor SOI substrate 1 having a high degree of thermal conductivity. It is to be noted that the thin film 10 can be also constituted of the cantilever 46, but a drawing and a description thereof will be omitted here. FIG. 5 of this example is a cross-sectional schematic view showing an example that the heat conduction-type sensor chip 100 is applied to a thermal flow sensor and it is provided as a thermal flow sensor 400 modularized by incorporating a calibration circuit 200. The modularized thermal flow sensor 400 includes external output terminals 330 so that an indication unit, a power supply, and others provided outside can be connected. A flow tube narrowed portion 321 that realizes a smooth flow to achieve a laminar flow is provided in a flow tube 320 through which a measurement target fluid flows, a thermal flow sensor chip 101 is disposed in a region of the flow tube narrowed portion 321, and the thin film 10 and the thin film 12 as sensing portions of the thermal flow sensor are arranged so as to directly come into contact with the measurement target fluid. Additionally, FIG. 6 shows a transverse cross-sectional schematic view of a thermal flow sensor when the heat conduction-type sensor chip 100 depicted in FIG. 3 or FIG. 4 is mounted on a package 300 and disposed in the flow tube 320, and this sensor includes calibration circuit terminals 76 so that the sensor can be electrically connected to the calibration circuit 200 provided outside through a cable 350 or the like having a socket. FIG. 7 shows, as an example of the calibration circuit 200 provided outside, a state that the amplifier 210, the arithmetic circuit 220, and the control circuit 230 as primary portions of the calibration circuit 200, temperature changing means 250, and others are accommodated in a housing 500. Of course, although not shown in FIG. 7, not only a circuit as the calibration circuit 200 but also a power supply for operating the thermal flow sensor, a circuit required for indication, and others can be put in the housing 500 of the calibration circuit 200. The operation principle when the heat conduction-type sensor depicted in FIG. 3 or FIG. 4 is applied to the thermal flow sensor or the thermal barometric sensor is as described in conjunction with Example 1 and Example 2, a difference lies in that the primary parts of the calibration circuit 200 are provided on the substrate 1 or they are provided outside, and the principle is essentially not different, thereby omitting a description thereof.

Example 4

Figure 8:
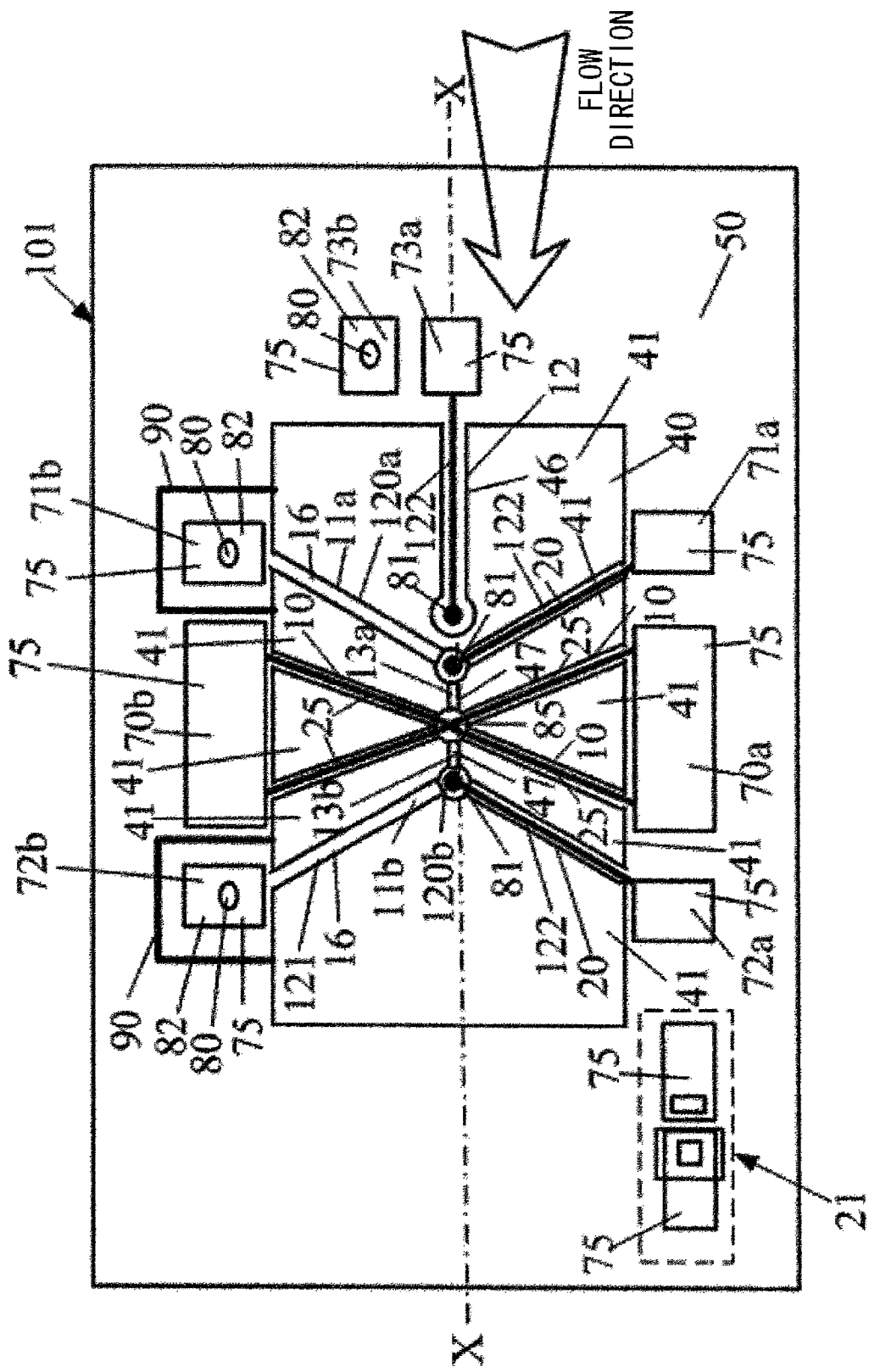
FIG. 8 is a plan schematic view of a thermal flow sensor chip showing another example when the heat conduction-type sensor according to the present invention is applied to the thermal flow sensor (Example 4)
Figure 9:
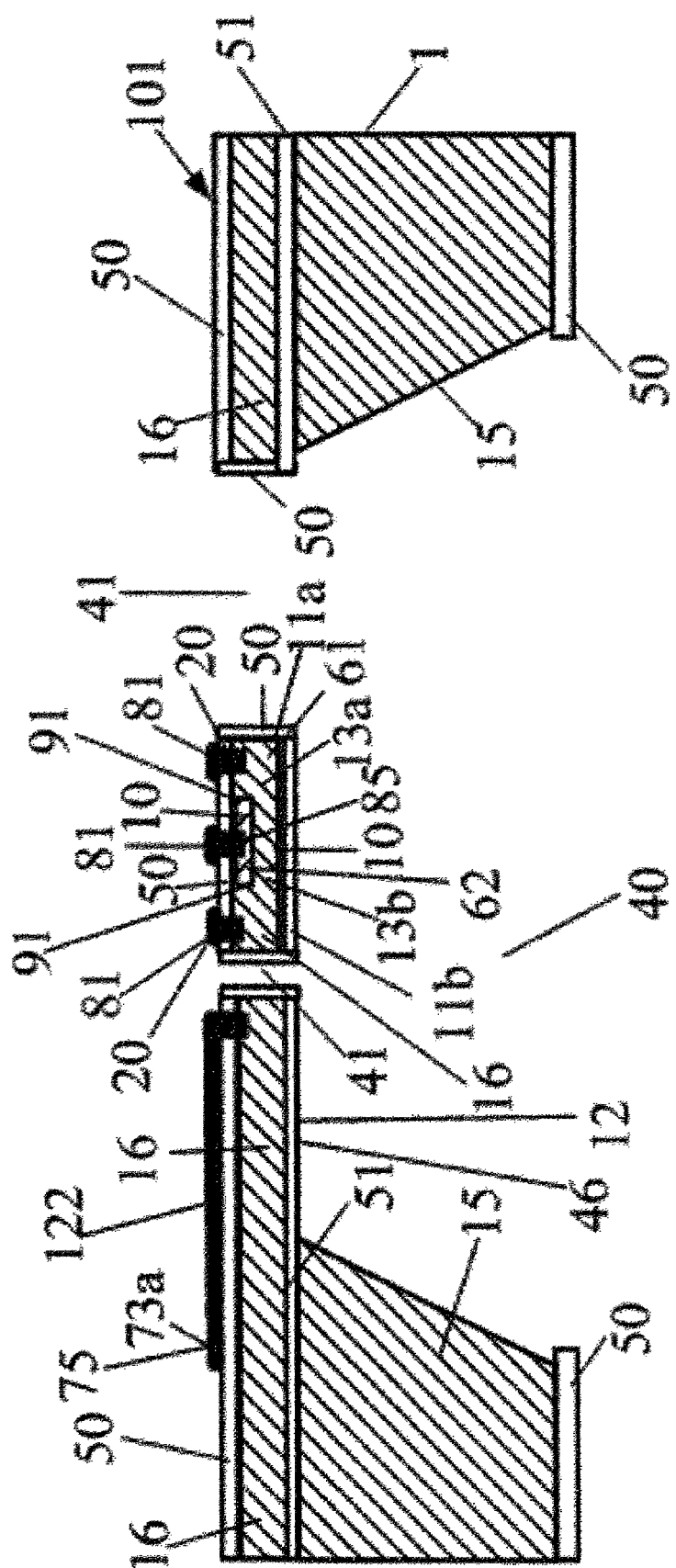
FIG. 9 is a cross-sectional schematic view taken along a line X-X in FIG. 8 (Example 4)

FIG. 8 is a plan schematic view of a thermal flow sensor chip 101 showing still another example of applying the heat conduction-type sensor to a thermal flow sensor, a thin film 11a and a thin film 11b are formed on the upstream side and the downstream side of a flow of a measurement target fluid of a thin film 10 thermally separated from a substrate 1 having a heater 25 mounted thereon like a conventional thermal flow sensor besides a thin film 12 provided to calibrate effects of a type or a temperature of the measurement target fluid, and a temperature sensor 20 is formed on each of these thin films 11a and 11b. In particular, this example is schemed in such a manner that a high-sensitivity thermal flow sensor can be achieved, a compact and extremely small sensor can be formed, and a temperature or a type of the measurement target fluid as the surrounding fluid are hard to affect a flow velocity or a mass flow as an output from the flow sensor. Therefore, a maximum temperature region 85 of the thin film 10 is connected through a coupling thin film 13 to a position close to a central portion where the thin film 11a and the thin film 11b have a maximum temperature when extremely heated. The portion of this coupling thin film 13 is narrowly formed to serve as a thermal resistance region 47 so that a temperature difference can be produced between the thin film 11a and the thin film 11b when the thin film 10 is heated by a heater and the measurement target fluid flows. The thin film 12 has a configuration of a cantilever 46, a thin-film thermocouple 120 preferable for temperature difference detection is used as the temperature sensor 20, its hot junction 81 is provided at an end portion of the cantilever 46, and close spacing is adopted so that heat given by the heater 25 can be transferred to the end portion only through the measurement target fluid to heat the end portion. Each of the thin film 10 formed into an X-like shape while considering geometric symmetry for a heat distribution and the thin film 11 is formed as a bridge configuration of a thin film floating in midair using a cavity 40. It is to be noted that, here, the thin film 11 is divided into two pieces, and the upstream side of the thin film 10 along a flow direction of the measurement target fluid is formed as the thin film 11a whilst the downstream side of the same is formed as the thin film 11b. Further, nichrome that can resist an alkaline etchant is used for metal wiring lines, electrode pads, and a thermocouple conductor 62 of one thin-film thermocouple 120. FIG. 9 is a cross-sectional schematic view taken alone a cross section X-X of the thermal flow sensor chip 101 in FIG. 8.

When silicon single crystal is subjected to anisotropic etching with an alkaline etchant, since a plane (111) is a crystal plane that is very hard to be etched, the etching is substantially stopped on the plane (111). In FIG. 8 or FIG. 9 of this example, since an SOI substrate having the plane (111) is used as the substrate 1, selection of length directions of the thin film 10, the thin film 11a, the thin film 11b, and the thin film 12 is important so that silicon below these films can be readily removed by etching, and the films are formed to have given angles so that the length directions of these thin films do not become parallel to a crystal direction (110) and the cavity 40 is bridged here. Therefore, the thin film 10 has the X-shaped configuration, and both the thin film 11 and the thin film 12 have a bent configuration. A point that a temperature is apt to increase when these films have longer lengths is taken into consideration. When adopting a dry process such as DRIE using no anisotropic etching, consideration for the length direction of such a thin film 10 or thin film 11 is not required.

In this example, the thin-film thermocouple 120a and the thin-film thermocouple 120b as the temperature sensors 20 of the thin film 11a on the upstream side and the thin film 11b on the downstream side are formed using the thin film 11a and the thin film 11b each constituted of an n-type SOI layer 16 as one thermocouple conductor 121, and the other thermocouple conductor 122 is made of a metal forming a nichrome thin film like the heater 25. Further, the hot junctions 81 of these members are coupled with the maximum temperature region 85 of the X-shaped thin film 10 through a coupling thin film 13a and a coupling thin film 13b of the SOI layer 16. Therefore, when the heater 25 is heated, the hot junctions 81 of the thin-film thermocouple 120a and the thin-film thermocouple 120a are heated through the coupling thin film 13a and the coupling thin film 13b of the solid SOI layer 16. Cold junctions 82 of the thin-film thermocouple 120a and the thin-film thermocouple 120b of the thin film 11a and the thin film 11b each having the bridge structure are provided on the substrate 1 near supporting portions of the thin film 11a and the thin film 11b, and they correspond to a pair of the electrode pad 71a and the electrode pad 71b and a pair of the electrode pad 72a and the electrode pad 72b. In regard to a temperature of the cold junctions 82, since the silicon single crystal substrate is used at a temperature of the substrate 1, a heat transfer coefficient of the cold junction is comparable to that of a metal, and it can be considered that the substrate 1 substantially has a uniform temperature. Further, the SOI layer 16 in regions of the electrode pad 71b and the electrode pad 72b provided near the supporting portions of the thin film 11a and the thin film 11b including the cavity 40 is surrounded by a discrete insulating groove 90 to achieve electrical insulation from the SOI layer 16 in other regions. Here, it is important for the supporting portions of the thin film 11a and the thin film 11b to prevent a flow of heat produced by heating from directly flowing to the substrate 1 via the thin film 11a and the thin film 11b along a flow direction of the measurement target fluid and to prevent a temperature peak from deviating in the flow direction of the measurement target fluid and exceeding the hot junctions 81 (setting the hot junctions 81 of the thermocouples formed on the thin film 11a and the thin film 11b to function as end portions with respect to the flow direction).

When a heater drive voltage was applied to a portion between the electrode pad 70a and the electrode pad 70b to heat the heater 25 with, e.g., 20 milliwatts (mW), although depending on a dimension of the thin film 10, the central portion of the thin film 10 having the substantially X-like configuration had a temperature rise of approximately 20° C. in an experiment in a situation that the measurement target fluid which is, e.g., air had no flow. Further, since the SOI layer 16 has a fixed thickness, a width of each of the coupling thin film 13a and the coupling thin film 13b is formed to be narrower than the hot junction 81 or the maximum temperature region 85, and a length of the same is adjusted to aggressively form heat resistance, although depending on dimensions of the coupling thin film 13a and the coupling thin film 13b, a temperature of the hot junction 81 of each of the thin film 11a and the thin film 11b symmetrically arranged with respect to the thin film 10 is lowered approximately 3° C. and increased 17° C. based on a room temperature. When the measurement target fluid has an air flow, a temperature of the thin film 11a on the upstream side is increased 16° C. from a room temperature (e.g., 25° C.) and a temperature of the thin film 11b on the downstream side is increased 16.8° C. in accordance with a velocity of the flow, for example. At this time, a temperature at the central portion of the thin film 10 is slightly lowered and becomes, e.g., 19° C. At this time, a temperature of the heated thin film 10 and a temperature of the thin film 11a coupled with the thin film 10 through the coupling thin film 13a do not have a large difference, but the calibration thin film 12 arranged in proximity to these films is heated only through the measurement target fluid, although depending on a distance from the thin film 11a, its temperature is therefore increased approximately 5° C. from an ambient temperature. Since the thin film 11a on the upstream side and the thin film 11b on the downstream side are connected to the thin film 10 including the heater 25 through the coupling thin films 13a and 13b of the SOI layer which have heat resistance but have high heat transfer coefficients, a temperature difference between the thin film 11a on the upstream side and the thin film 11b on the downstream side due to a flow of the measurement target fluid is mainly based on a change in temperature distribution of the measurement target fluid due to the flow, thereby reducing effects of a heat transfer coefficient $h_u$ of the measurement target fluid. Therefore, there can be obtained an advantage that effects of a type and effects of a temperature of the measurement target fluid are reduced, the substrate 1 at the end portion of the cavity 40 in the flow direction of the fluid does not have the supporting portions of the thin film 10 and the thin film 11, and hence a temperature difference between the thin film 11a on the upstream side and the thin film 11b on the downstream side is apt to increase, thereby also obtaining an advantage of high sensitivity.

In this example, since the thin film 12 independent form the thin film 10 or the thin film 11 is provided and the calibration circuit terminals 75 also function as the respective electrode pads so that the calibration circuit 200 can be provided outside this thermal flow sensor chip 101, the heat transfer coefficient $h_u$ of the measurement target fluid can be calculated like the above description, and automatic calibration can be carried out to eliminate effects of a type or a temperature of the measurement target fluid as a detailed physical state such as a mass flow. It is to be noted that a pn junction 91 as an absolute temperature sensor 21 for grasping a reference temperature of the substrate 1 is formed on the same substrate 1.

Example 5

Figure 10:
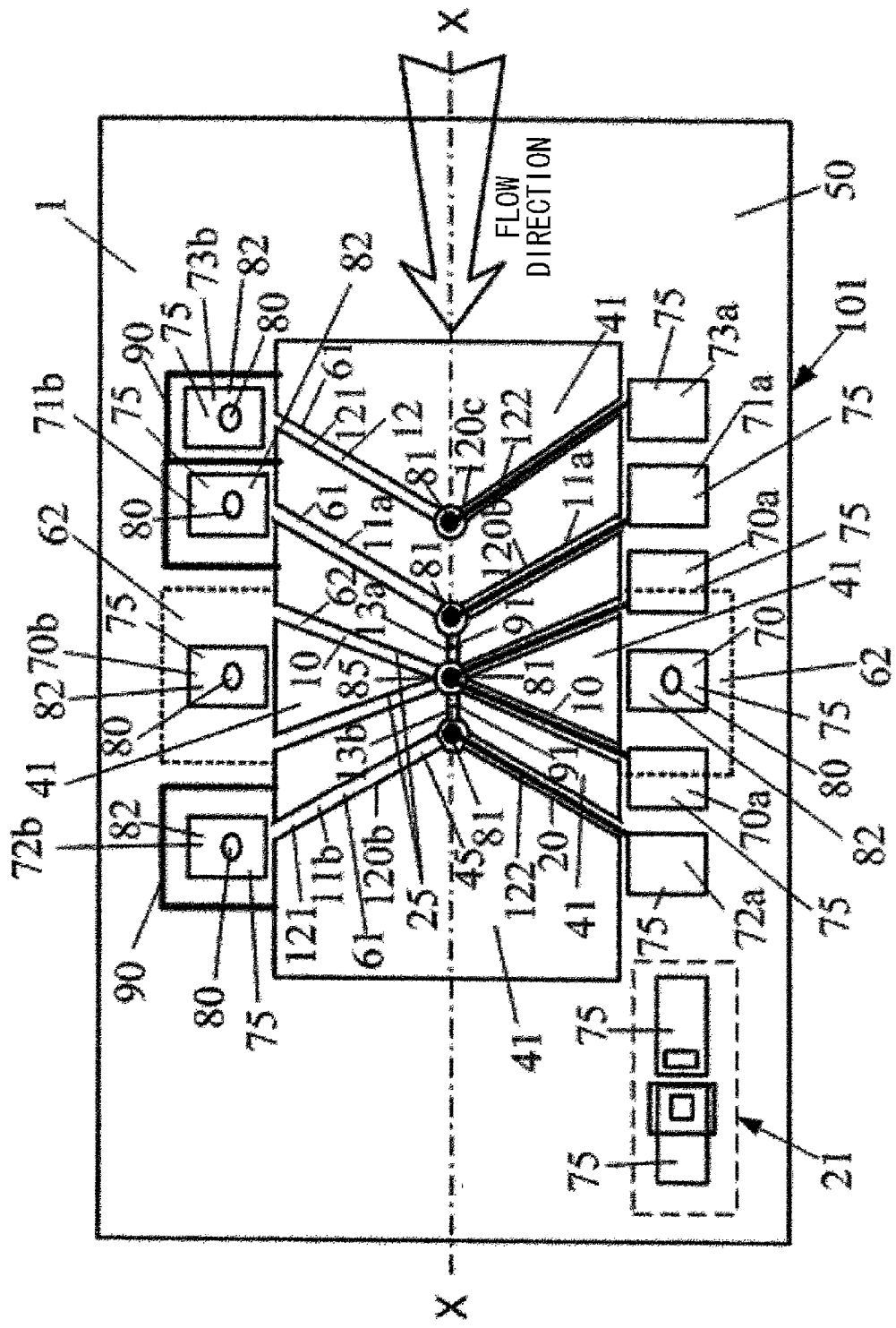
FIG. 10 is a plan schematic view of a thermal flow sensor chip showing still another example when the heat conduction-type sensor according to the present invention is applied to the thermal flow sensor (Example 5)

FIG. 10 is a plan schematic view of a thermal flow sensor chip 101 showing still another example when the heat conduction-type sensor is applied to the thermal flow sensor. It can be considered that heat generated by heating of a heater 25 formed on a thin film 10 can reach a thin film 12 only through a measurement target fluid (actually, there is an element that is heated through a supporting portion of the thin film 12 from a substrate 1, but this element can be substantially ignored if it has a sufficient heat capacity and high thermal conductivity). Since heating using the heater as the thermal flow sensor, a method of taking out outputs from a thin-film thermocouple 120a and a thin-film thermocouple 120b formed on a thin film 11a and a thin film 11b, and others are equal to those in the foregoing examples, a description thereof will be omitted. A temperature of the thin film 12 is increased from a room temperature which is an ambient temperature only through the measurement target fluid such as air as described above, but a heat transfer coefficient of the measurement target fluid largely differs depending on a type or a temperature of the fluid, and hence errors are produced in a flow velocity of the measurement target fluid and determination of the flow velocity based on an output difference between the thin-film thermocouple 120a and the thin-film thermocouple 120b even though the thin-film 10 is driven at a fixed temperature. To correct the errors, an output from a thin-film thermocouple 120c formed on the thin film 12 that is directly affected by the heat transfer coefficient of the measurement target fluid is used like the foregoing examples.

Effects of temperature dependence and others of the heat transfer coefficient of the measurement target fluid can be corrected by feeding back the output from the thin-film thermocouple 120c formed on the thin film 12 to the heater 25 of the thin film 10 or an arithmetic circuit. In this example, the heater 25 formed on the thin film 10 is a p-type diffusion region 62 formed by thermally diffusing a p-type impurity in a part of an n-type SOI layer 16, and a current is flowed through the p-type diffusion region 62 near a front surface of the SOI layer 16 of the thin film 10 bridging a cavity 40 formed in the substrate 1, whereby the SOI layer 16 of the thin film 10 generates heat. At this time a drive voltage of the heater 25 is applied to a portion between an electrode pad 70 and an electrode pad 70b sandwiching the cavity 40. The electrode pad 70 and the electrode pad 70b are electrically conductive with respect to the p-type diffusion region 62 through contact holes 80 provided below them. It is to be noted that since the SOI layer 16 is of the n type, the p-type diffusion region 62 is electrically insulated from the region of the n-type SOI layer 16 because of a pn junction. Further, the thin film 11 having the thin-film thermocouple 120 as a temperature sensor 20 formed thereon is divided into two pieces, and a thin-film thermocouple 120a and a thin-film thermocouple 120b formed on the thin film 11a on the upstream side and the thin film 11b on the downstream side are likewise electrically separated from each other because of pn junctions 91 formed on a coupling thin film 13a and a coupling thin film 13b coupling the thin film 11a to the thin film 10 and coupling the thin film 10 to the thin film 11b. Therefore, with regard to the electrode pad 70 of the heater 25, when a negative heater drive voltage is applied to the electrode pad 70b, the pn junctions 91 formed on the coupling thin film 13a and the coupling thin film 13b are biased in the reverse direction, and hot junctions 81 of the thin-film thermocouple 120a and the thin-film thermocouple 120b formed on the thin film 11a and the thin film 11b are not affected by the heater drive voltage.

Example 6

Figure 11:
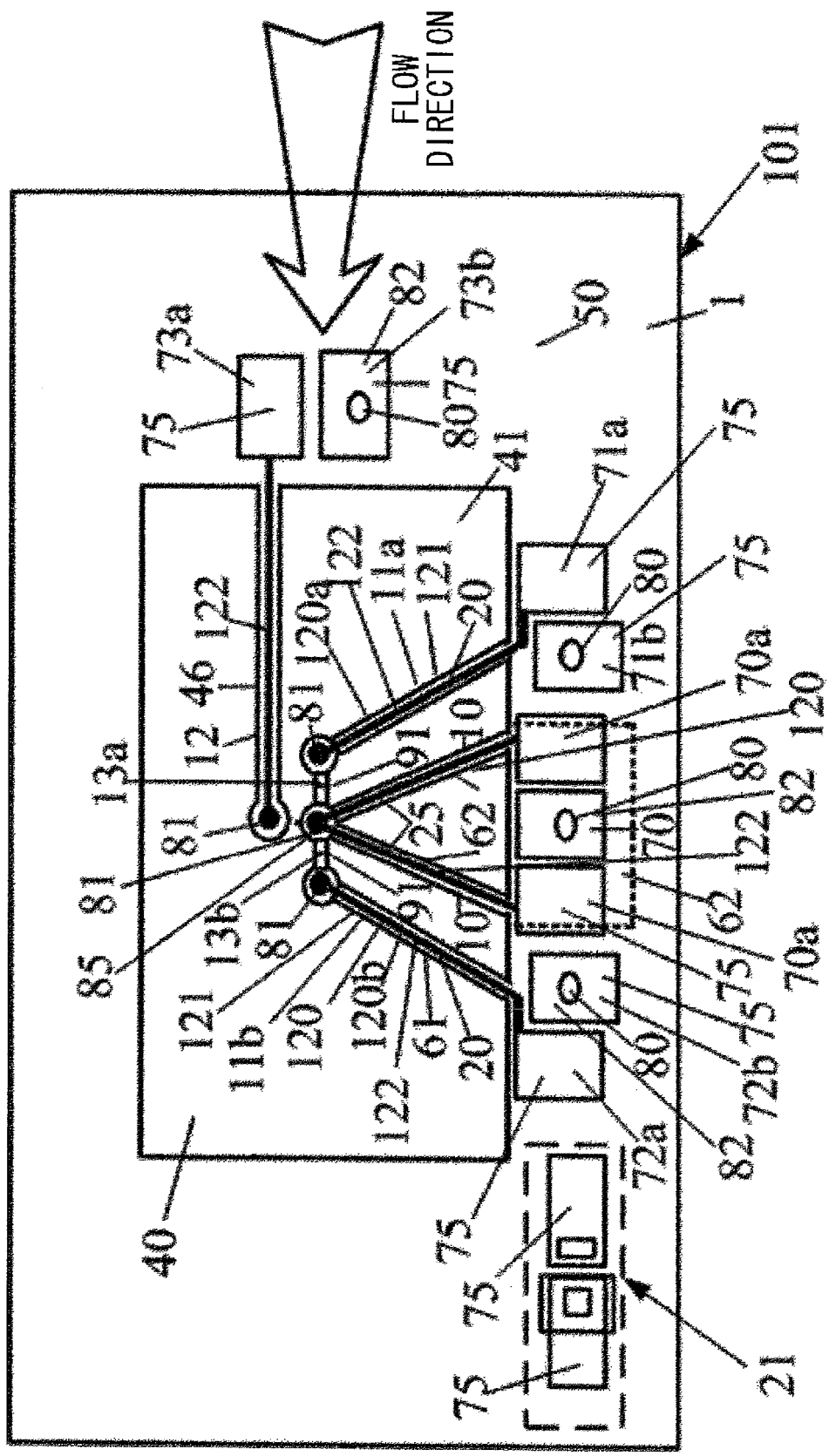
FIG. 11 is a plan schematic view of a thermal flow sensor chip showing yet another example of the thermal flow sensor according to the present invention (Example 6)

FIG. 11 is a plan schematic view of a thermal flow sensor chip 101 showing yet another example of the thermal flow sensor according to the present invention. As a difference from FIG. 10 of Example 5, the thin film 10, the thin film 11a, and the thin film 11b all have a bridge structure crossing the cavity 40 in FIG. 10 whereas each supporting portion are provided on one side surface of a substrate in a cavity 40 and a cantilever structure extending from this supporting portion is formed in FIG. 11 according to this example. Therefore, this example corresponds to a case that a heater 25 formed on an inverted triangular thin film 10 or both a thin film 11a and a thin film 11b have supporting portions on the substrate 1 on one side surface of the cavity 40. Here, likewise, a p-type diffusion region 62 is formed in an n-type SOI layer 16, and it is electrically insulated from a region of any other n-type SOI layer 16 by using each pn junction 91. Therefore, in regard to electrode pads for heating the heater 25, for example, a heater drive voltage is applied to a portion between an electrode pad 70 and two electrode pads 70a which are connected in parallel (in which case, a thin-film thermocouple 120 is used as the heater 25), or a thermocouple conductor 122 which is a nichrome thin film is used as the heater 25 for a metal resistive element and the heater drive voltage is applied to a portion between the two independent electrode pads 70a. Further, like Example 1, a temperature of a maximum temperature region 85 which is an end portion of the thin film 10 having a cantilever shape can be monitored based on a temperature of the substrate 1 by using an output of thermal electromotive force that appears between the electrode pad 70 and each electrode pad 70a of thin-film thermocouples 120 of the thin film 10 immediately after stopping heating of the heater 25. Formation of a thin film 12 for a calibration circuit 200 is the same as that shown in FIG. 10 of Example 5, a point that electrode pads of the respective thin-film thermocouples 120 or the heater 25 also function as calibration circuit terminals 75 to electrically connect to the calibration circuit 200 provided outside is the same as that in FIG. 10, and an operation of the calibration circuit 200 is the same too.

When the thin film 10 is heated by the heater 25, as described with reference to FIG. 10 of Example 5, the thin film 11a and the thin film 11b, which are symmetrically arranged, are also heated through a coupling thin film 13a and a coupling thin film 13b. A thin-film thermocouple 120a and a thin-film thermocouple 120b formed on the thin film 11a and the thin film 11b are equivalently heated to have the same temperature when a fluid has no flow. However, when the fluid has a flow, the thin film 11a on the upstream side is cooled, but a temperature of the thin film 11b on the downstream side is increased due to effects of heating of the heater 25 on the thin film 10. An imperceptible flow velocity can be determined from a relationship of a temperature difference between the thin-film thermocouple 120a and the thin-film thermocouple 120b and a flow velocity of the measurement target fluid. Of course, the flow velocity can be determined from not only the temperature difference between the thin-film thermocouple 120a and the thin-film thermocouple 120b but also a previously examined relationship between an output from the thin-film thermocouple 120a on the upstream side alone or an output from the thin-film thermocouple 120b on the downstream side and the flow velocity. In case of immediately after stopping heating, the flow velocity can be obtained from a relationship of an output which is a difference between an output from the thin-film thermocouple 120 formed on the thin film 10 and an output from the thin-film thermocouple 120a on the upstream side or an output from the thin-film thermocouple 120b on the downstream side and the flow velocity, like FIG. 10 of Example 5. It is to be noted that output terminals of the thin-film thermocouple 120a and the thin-film thermocouple 120b are the electrode pad 71a, the electrode pad 71b, the electrode pad 72a, and the electrode pad 72b, the electrode pad 71b and the electrode pad 72b are connected to the same SOI layer 16 via ohmic contacts in a measurement circuit, and hence these pads can be treated as equipotentials. Here, although not shown, a discrete insulating groove 90 may be formed around the electrode pad 71b and the electrode pad 72b so that these electrode pads can be independent from each other.

Example 7

Figure 12:
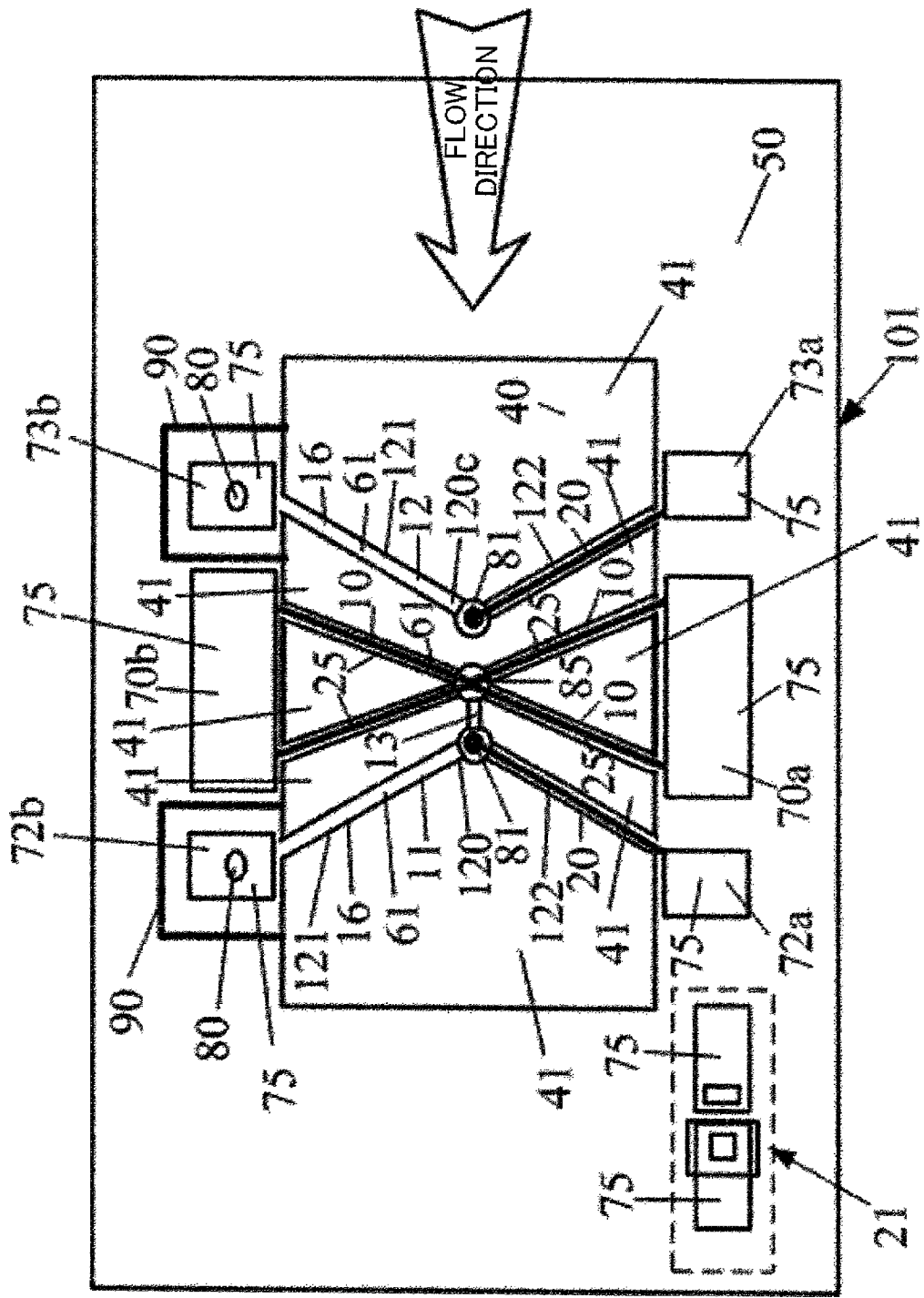
FIG. 12 is a plan schematic view of the thermal flow sensor showing a further example of the thermal flow sensor according to the present invention (Example 7)

FIG. 12 is a plan schematic view of a thermal flow sensor showing a further example of the thermal flow sensor according to the present invention, the coupling thin film 13a of the thin film 11a in FIG. 8 of Example 4 is removed, and a resultant structure is used as a thin film 12 which is an independent thin film without the coupling thin film 13 like FIG. 8 of Example 4. A thin-film thermocouple 120c is formed on the thin film 12. Therefore, a basic operation is the same as that in FIG. 8 of Example 4, and effects of temperature dependence and others of a heat transfer coefficient of a measurement target fluid are corrected (calibrated) for the thin film 12 that is directly affected by the heat transfer coefficient of the measurement target fluid. Since the calibration method is the same as that in FIG. 8 of Example 4, a description thereof will be omitted.

Although the SOI layer 16 which is the same as that for the thin film 10, the thin film 11a, and the thin film 11b is used for the coupling thin film 13 in the foregoing example, a silicon oxide film, a silicon nitride film, or an alumina film having electrical insulation properties may be used, or the coupling thin film 13 may be formed of a conductor such as a metal thin film but a silicon oxide film may be used to achieve electrical insulation from the thin film 10, the thin film 11a, and the thin film 11b. Further, the thin-film thermocouple 120a and the thin-film thermocouple 120b formed on the thin film 11a and the thin film 11b may be prevented from being affected by a drive voltage of the heater 25 by forming the coupling thin film 13 using an electrical insulating material or achieving electrical insulation from the thin film 10, the thin film 11a, and the thin film 11b.

Example 8

Figure 13:
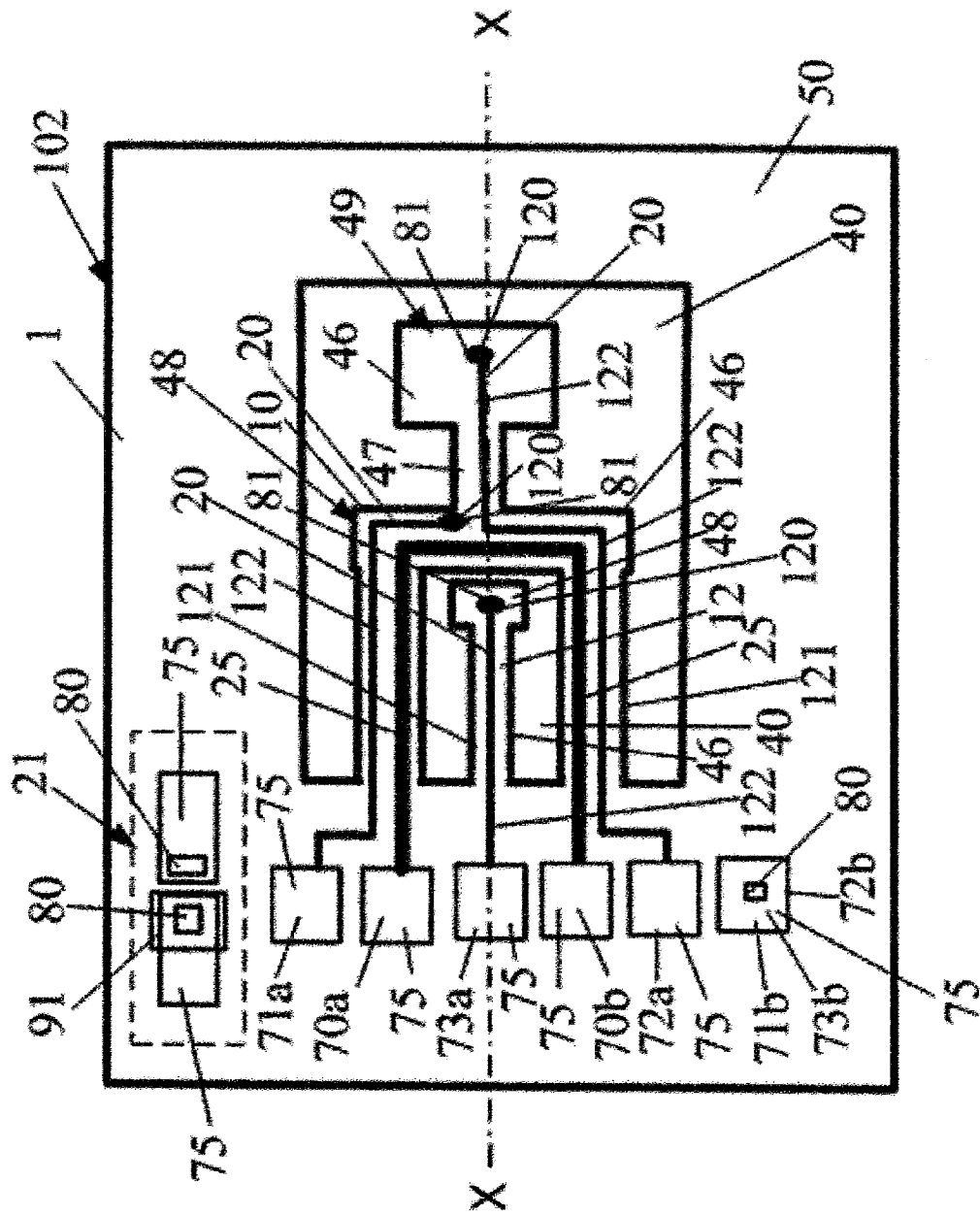
FIG. 13 is a plan schematic view of a thermal barometric sensor chip showing another example when the heat conduction-type sensor according to the present invention is applied to thermal barometric sensor (Example 8)
Figure 14:
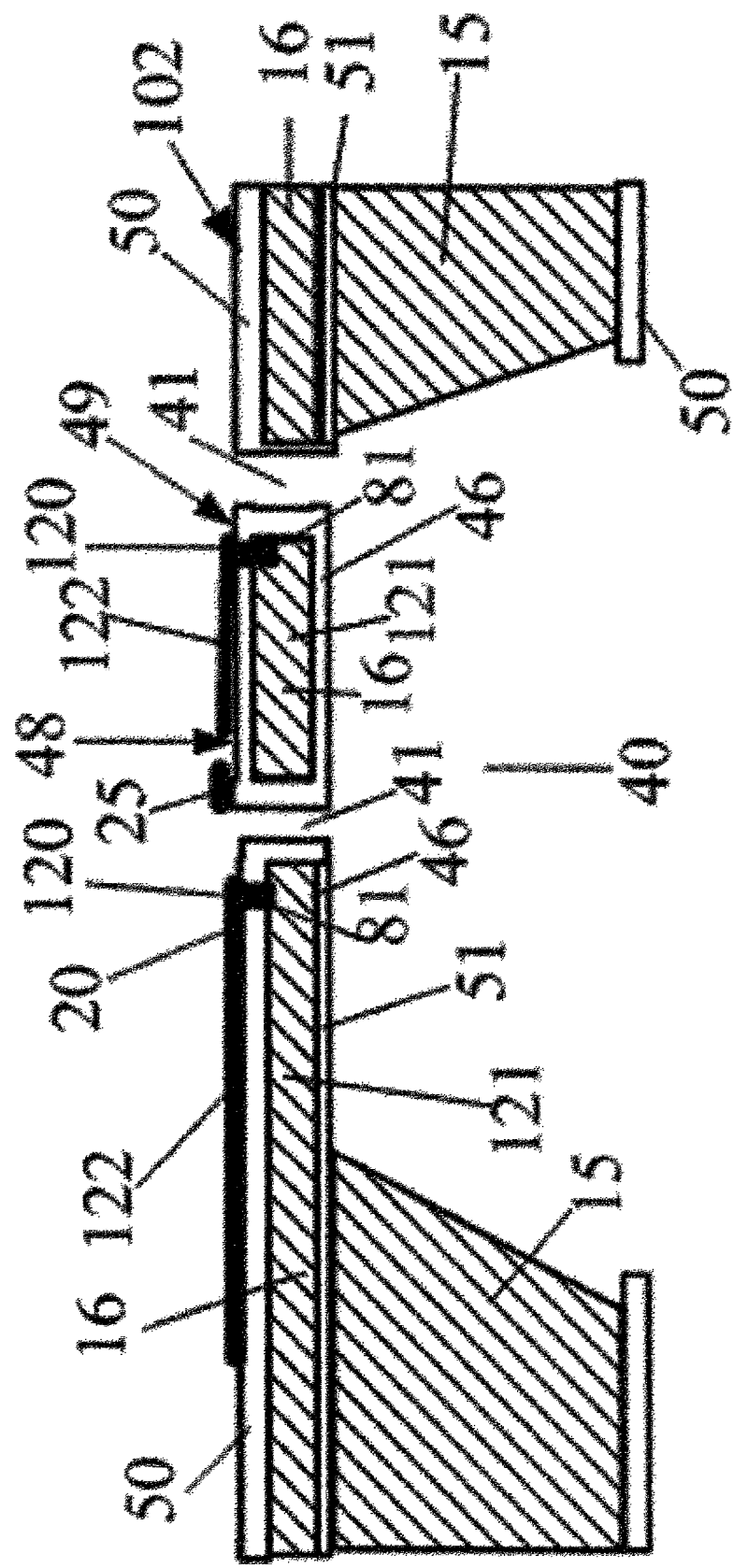
FIG. 14 is a cross-sectional schematic view taken along a line X-X in FIG. 13.

FIG. 13 is a plane schematic view of an example of a thermal barometric sensor chip 102 showing another example of applying the heat conduction-type sensor according to the present invention to a thermal barometric sensor. FIG. 14 is a transverse cross-sectional schematic view taken alone a line X-X in FIG. 13. In particular, this example provides a thermal barometric sensor that is enabled to specify a measurement target fluid which is an unknown gas and calculate a true atmospheric pressure of the fluid by arranging a thin film 12 for calibration which is thermally separated from a substrate 1 in proximity to a heater 25 of a thin film 10 in the thermal barometric sensor for a wide band from a known high vacuum to 1 atmosphere or above. Under a standard gas, e.g., a nitrogen gas having an air pressure or a predetermined atmospheric pressure of, e.g., 1 atmosphere, a heat transfer coefficient $h_u$ of an unknown gas which is the measurement target fluid is calculated from information concerning a temperature of the thin film 12 at the predetermined atmospheric pressure of the unknown gas as the measurement target fluid or information of a temperature difference between a region A 48 and a region B 49 sandwiching a thermal resistance region 47 on the thin film 10 based on a database concerning a heat transfer coefficient $h_s$ of the measurement target fluid at a predetermined temperature Ta, thereby calibrating the atmospheric pressure of the unknown gas. The thin film 10 has a structure of a cantilever 46, the cantilever 46 is divided into the region A 48 on a supporting portion side and the region B 79 on an end side through the thermal resistance region 47, the region A 48 includes at least a heater 25 and a temperature sensor 20, and the region B 49 includes the temperature sensor 20. The thermal resistance region 47 in this example serves as the coupling thin film 13 of the thermal flow sensor in Examples 5 to 7 and is formed of a semiconductor thin film having thermal conductivity that is extremely high for an ambient gas as the measurement target fluid, thereby providing a configuration that is essentially hard to be affected by a type or a temperature of the measurement target fluid.

The thermal barometric sensor according to the example measures a temperature difference between the region A 48 and the region B 49. The thin film 10 has a double structure having different thermal expansion coefficients, and the thin film 10 heated by bending deformation vibration is forcibly cooled based on expansion/contraction of the double structure at the time of heating/cooling of the heater 25 to measure a temperature difference between the region A 48 and the region B 49, thereby enabling measuring an atmospheric pressure close to 1 atmosphere or higher atmospheric pressures from a level of cooling. In the thermal barometric sensor according to the present invention, information concerning a heat transfer coefficient of the gas at that time is obtained based on temperature output information of the thin film 12, temperature information of the gas, and temperature output information of the thin film 10, and the obtained information is compared with data of the standard gas acquired by this thermal barometric sensor in advance, whereby automatic calibration can be carried out using a calibration circuit 200. It is to be noted that, like the thermal flow sensor, when a temperature of the heater 25 is changed in many ways by temperature changing means 250 of the heater 25 to enable measuring temperature dependence of the heat transfer coefficient of the gas as the measurement target fluid, a type of this gas can be specified. In this example, calibration circuit means 200 is provided outside, and calibration circuit terminals for achieving electrical connection with the calibration circuit means 200 for controlling heating of the heater or transmitting/receiving signals with the calibration circuit means 200 are configured to also function as electrode pads of the thin-film thermocouples 120, the heater 25, or an absolute temperature sensor 21 in the thermal barometric sensor chip 102 like the foregoing examples of the thermal flow sensor. A calculation method for the heat transfer coefficient $h_s$ using the standard gas under 1 atmosphere and the heat transfer coefficient $h_u$ of the unknown gas based on an experiment using Newton's law of cooling of Expression 1 and use of a ratio of these coefficients are equal to those of the thermal barometric sensor described in Example 2, thereby omitting a description thereof.

The thermal flow sensor according to the present invention is not restricted to this example, and it can be modified in many ways while having the same gist, effects, and functions of the present invention as a matter of course.

INDUSTRIAL APPLICABILITY

According to the heat conduction-type sensor that can automatically configure effects of, e.g., a type or a temperature of a measurement target fluid, and the thermal flow sensor and the thermal barometric sensor having this function of the present invention, in conventional examples, since a heat transfer coefficient of an unknown fluid is not clear, indication of, e.g., a flow velocity, a mass flow, or an atmospheric pressure differs depending on a type or a temperature of the measurement target fluid, and hence calibration cannot be performed even though considerable errors are produced. However, the present invention enables the automatic calibration, whereby accurate measurement can be carried out. Additionally, since the sensor chip can be formed based on the MEMS technology, the sensor chip has an ultracompact sensing portion and a standardized shape with a high-volume production capability, thus providing high sensitivity. The thin-film thermocouple can be used for the temperature sensor, which is preferable in the heat conduction-type sensor that is proactive in measuring a temperature difference. In both the thermal flow sensor and the thermal barometric sensor, a solid thin film having good thermal conductivity can be used to couple the heater 25 with the other thin film 11 which is connected through the thermal resistance region 47 serving as the coupling thin film, it is possible to provide the configuration that is hardly affected by, e.g., a type or a temperature of the measurement target fluid and insensitive with respect to temperature dependence of a heat transfer coefficient of the measurement target fluid.

The invention claimed is:

1. A heat conduction-type sensor comprising at least two thin films thermally separated from a substrate (1) by the same cavity (40), wherein one thin film (10) comprises at least a heater (25) and a temperature sensor (20), the other thin film (12) comprises a temperature sensor (20), the thin film (10) and the thin film (12) are formed to be arranged in proximity to and spatially separated from each other so that the thin film (12) is heated only through a measurement target fluid when the thin film (10) is heated by the heater (25), and the substrate (1) comprises calibration circuit means (200) configured to calculate an amount concerning heat transfer coefficients of a standard fluid and the unknown measurement target fluid based on information concerning a temperature of the heater (25) when heating the heater (25), information concerning temperatures of the standard fluid and the unknown measurement target fluid from the temperature sensor (20) formed on the thin film (12), and information of a temperature of the measurement target fluid at the time of measuring a physical state of the measurement target fluid and to calibrate effects of a temperature and a type of the measurement target fluid on the measurement of the physical state of the measurement target fluid based on the amount concerning the heat transfer coefficients, or the substrate (1) comprises a calibration circuit terminal configured to communicate with the calibration circuit means (200) provided outside.

2. The heat conduction-type sensor according to claim 1, comprising temperature changing means (250) for changing a heating temperature of the heater (25), wherein the temperature changing means (25) is configured to enable obtaining the information when a temperature is changed, thereby specifying a type of the measurement target fluid.

3. The heat conduction-type sensor according to claim 1, wherein the temperature sensor (20) is a thin-film thermocouple (120).

4. The heat conduction-type sensor according to claim 1, wherein an absolute temperature sensor is formed on the substrate (1).

5. The heat conduction-type sensor according to claim 1, wherein the thin film (10) and the thin film (20) are constituted of an SOI layer.

6. A thermal flow sensor, wherein the physical state of the measurement target fluid in the heat conduction-type sensor according to claim 1 is a flow velocity or a mass flow, and the calibration circuit means (200) comprises at least an amplification circuit, an arithmetic circuit, and a control circuit.

7. The thermal flow sensor according to claim 6, comprising a thin film (11) thermally separated from a substrate (1) through the cavity (40) besides the thin film (10), wherein the thin film (11) comprises a temperature sensor (20), the thin film (11) and the thin film (10) are coupled through a coupling thin film (13) whose width is narrowed to have thermal resistance in the vicinity of a maximum temperature region (85), and the thin film (11) is heated through the coupling thin film (13) when the thin film (10) is heated by the heater (25).

8. The thermal flow sensor according to claim 6, wherein the thin film (11) and the coupling thin film (13) are constituted of an SOI layer.

9. The thermal flow sensor according to claim 8, wherein a pn junction diode is formed on the coupling thin film (13) to obtain electrical insulation of the thin film (10) and the thin film (11).

10. The thermal flow sensor according to claim 6, wherein a temperature-sensitive resistor, a thermocouple, or a diode is used as the heater (25) provided on the thin film (10), and the heater (25) is configured to be also used as a heater and a temperature sensor as required.

11. The thermal flow sensor according to claim 6, comprising at least two thin films, i.e., a thin film (11*a*) having a thin-film thermocouple (120*a*) provided on the upstream side and a thin film (11*b*) having a thin-film thermocouple (120*b*) provided on the downstream side as the thin film (11) having the thin-film thermocouple (120) provided thereon with respect to the thin film (10), wherein regions of hot junctions of the respective thin-film thermocouples (120*a*, 120*b*) are coupled with the thin film (10) through respective solid coupling thin film (13*a*) and thin film (13*b*) in the vicinity of a maximum temperature region (85).

12. A thermal barometric sensor, wherein the physical state of the measurement target fluid in the heat conduction-type sensor according to claim 1 is an atmospheric pressure, and the calibration circuit means (200) comprises at least an amplification circuit, an arithmetic circuit, and a control circuit.

13. The thermal barometric sensor according to claim 12, wherein the thin film (10) has a configuration of a cantilever (46), the cantilever (46) is divided into a region A (48) on a supporting portion side thereof and a region B (49) on an end side thereof through a thermal resistance region (47), the region A (48) comprises at least a heater (25) and a temperature (20), and the region B (49) comprises a temperature sensor (20).

14. The thermal barometric sensor according to claim 12, wherein the temperature sensor (20) of the thin film (12) is a thin-film thermocouple (120), and it is used for atmospheric pressure measurement of an atmospheric pressure that is both greater and not greater than 1 pascal (Pa) by utilizing a nature that the thin film (12) receives heat from the heater (25) only through a gas as the measurement target fluid to raise its temperature and measuring a temperature difference from the substrate (1) using the thin-film thermocouple (120).

15. The heat conduction-type sensor according to claim 2, wherein the temperature sensor (20) is a thin-film thermocouple (120).

16. The heat conduction-type sensor according to claim 2, wherein an absolute temperature sensor is formed on the substrate (1).

17. The heat conduction-type sensor according to claim 3, wherein an absolute temperature sensor is formed on the substrate (1).

18. The heat conduction-type sensor according to claim 2, wherein the thin film (10) and the thin film (20) are constituted of an SOI layer.

19. The heat conduction-type sensor according to claim 3, wherein the thin film (10) and the thin film (20) are constituted of an SOI layer.

20. The heat conduction-type sensor according to claim 4, wherein the thin film (10) and the thin film (20) are constituted of an SOI layer.

\* \* \* \* \*